(12) United States Patent
Kang et al.

(10) Patent No.: US 10,897,298 B2
(45) Date of Patent: Jan. 19, 2021

(54) ELECTRONIC DEVICE FOR PERFORMING COMMUNICATION BASED ON BEAMFORMING AND METHOD THEREFOR

(71) Applicant: Samsung Electronics Co., Ltd., Suwon-si (KR)

(72) Inventors: Mingyu Kang, Suwon-si (KR); Hyoungjoo Lee, Suwon-si (KR); Taeyoon Kim, Suwon-si (KR); Chaiman Lim, Suwon-si (KR); Suyoung Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/521,848

(22) Filed: Jul. 25, 2019

(65) Prior Publication Data
US 2020/0044709 A1 Feb. 6, 2020

(30) Foreign Application Priority Data
Aug. 3, 2018 (KR) .................. 10-2018-0090545

(51) Int. Cl.
*H04K 1/10* (2006.01)
*H04L 27/28* (2006.01)
(Continued)

(52) U.S. Cl.
CPC ......... *H04B 7/0617* (2013.01); *H04B 7/0404* (2013.01); *H04B 7/0695* (2013.01);
(Continued)

(58) Field of Classification Search
CPC .. H04B 7/0617; H04B 7/0404; H04B 17/318; H04B 7/0695; H04B 7/043; H04B 17/309; H04W 56/0015; H04W 88/02
(Continued)

(56) References Cited

U.S. PATENT DOCUMENTS 8,345,788 B2 1/2013 Moon et al.
8,425,557 B2 4/2013 Kuiper et al.
(Continued)

FOREIGN PATENT DOCUMENTS

KR 10-2006-0111811 A 10/2006
KR 10-2015-0004137 A 1/2015
(Continued)

OTHER PUBLICATIONS

International Search Report dated Nov. 13, 2019, issued in an International Application No. PCT/KR2019/009263.

*Primary Examiner* — Phuong Phu
(74) *Attorney, Agent, or Firm* — Jefferson IP Law, LLP

(57) ABSTRACT

An electronic device is provided. The electronic device includes a memory, a communication device comprising a plurality of N number of conductive plates arranged to form M number of beams, and at least one processor operatively connected to the memory and the communication device. The at least one processor receives a synchronization signal block set comprising a plurality of synchronization signal blocks corresponding to a plurality of beams from a base station using each of at least some of the plurality of N conductive plates and selects at least one of the M beams using the plurality of received synchronization signal blocks. Each of N and M is an integer of greater than or equal to 2.

19 Claims, 10 Drawing Sheets

(51) Int. Cl.
 *H04B 7/06* (2006.01)
 *H04W 56/00* (2009.01)
 *H04B 7/0404* (2017.01)
 *H04B 17/318* (2015.01)
 *H04W 88/02* (2009.01)

(52) U.S. Cl.
 CPC ...... *H04B 17/318* (2015.01); *H04W 56/0015* (2013.01); *H04W 88/02* (2013.01)

(58) Field of Classification Search
 USPC .................. 375/260, 267, 299, 346, 347
 See application file for complete search history.

(56) References Cited

U.S. PATENT DOCUMENTS

| | | |
|---|---|---|
| 9,426,766 B2 | 8/2016 | Jung et al. |
| 9,686,695 B2 | 6/2017 | Subramanian et al. |
| 10,419,138 B2 * | 9/2019 | Chopra ................ H04B 17/309 |
| 2010/0144302 A1 | 6/2010 | Moon et al. |
| 2013/0301454 A1 * | 11/2013 | Seol ....................... H04B 7/043 370/252 |
| 2015/0009984 A1 | 1/2015 | Jung et al. |
| 2016/0021549 A1 | 1/2016 | Subramanian et al. |
| 2018/0049116 A1 | 2/2018 | Islam et al. |
| 2018/0049167 A1 | 2/2018 | Islam et al. |
| 2018/0049177 A1 | 2/2018 | Islam et al. |
| 2018/0049245 A1 | 2/2018 | Islam et al. |
| 2018/0091204 A1 | 3/2018 | Islam et al. |
| 2018/0343629 A1 | 11/2018 | Choi et al. |
| 2019/0174423 A1 | 6/2019 | Zhang et al. |

FOREIGN PATENT DOCUMENTS

| | | |
|---|---|---|
| KR | 10-2017-0093720 A | 8/2017 |
| KR | 10-2017-0139867 A | 12/2017 |
| WO | 2018-062845 A1 | 4/2018 |
| WO | 2018-027231 A1 | 8/2018 |

\* cited by examiner

ELECTRONIC DEVICE FOR PERFORMING COMMUNICATION BASED ON BEAMFORMING AND METHOD THEREFOR

CROSS-REFERENCE TO RELATED APPLICATION(S)

This application is based on and claims priority under 35 U.S.C. § 119(a) of a Korean patent application number 10-2018-0090545, filed on Aug. 3, 2018, in the Korean Intellectual Property Office, the disclosure of which is incorporated by reference herein in its entirety.

BACKGROUND

1. Field

The disclosure relates to an electronic device for performing communication based on beamforming and a method therefor.

2. Description of Related Art

An electronic device may support cellular communication. The cellular communication may use, for example, a wireless protocol according to the communication specification standardized by 3rd generation partnership project (3GPP). With the development of the communication specification, the range of a frequency band usable by the electronic device has increasing. For example, in 5th generation (5G) mobile communication, the electronic device may increase a data transmission rate using mmWave (e.g., a signal of a frequency band of 6 GHz or more).

In the 5G mobile communication, a base station may include an antenna array. The base station may generate a plurality of beams facing different directions in a horizontal and/or vertical direction using the antenna array. Unlike 4G mobile communication, a user equipment which supports the 5G mobile communication may use beamforming technology to transmit or receive signals. Because a transmit end and a receive end support beamforming, the user equipment may determine a combination (or a beam pair) of a beam of the base station and a beam of the user equipment, indicating optimal link performance. For example, the user equipment may determine the combination of the beams through a beam tracking procedure.

The above information is presented as background information only to assist with an understanding of the disclosure. No determination has been made, and no assertion is made, as to whether any of the above might be applicable as prior art with regard to the disclosure.

SUMMARY

In 5G mobile communication, a base station may transmit a series of synchronization signal blocks corresponding to respective beams. For example, the base station may transmit the series of synchronization signal blocks during a specified period. The base station may transmit one or more synchronization signal blocks corresponding to one or more beams during specified period T. For example, the specified period T may be referred to as a synchronization signal (SS) burst or a synchronization signal block set. For beam tracking, a user equipment may receive synchronization signal blocks using one beam formed by applying beamforming during period T. The user equipment may receive a plurality of synchronization signal blocks using a beam formed by (for example, adjusting a phase associated with each of a plurality of antenna elements). For example, the user equipment may receive a plurality of synchronization signal blocks from the base station during period T with respect to each of M number of beams. When it is able to form the M beams, for example, the user equipment may perform beam tracking during a T×M time. Furthermore, the user equipment may perform beam tracking for neighbor cells as well as its serving cell.

As a time for beam tracking increases, a data throughput of the user equipment may be reduced, and a data throughput of the entire communication system may be decreased. For example, the user equipment may perform beam tracking for cell reselection and handover. As a time for beam tracking increases, handover and cell reselection may be delayed to reduce communication performance of the user equipment. For example, the user equipment may change to an active or wakeup state to receive an SS burst (or a synchronization signal set) at a specified period in a radio resource control (RRC) idle or inactive state. As an active or wakeup state time of the user equipment increases due to an increase in time for beam tracking, power consumed by the user equipment may be increased.

Aspects of the disclosure are to address at least the above-mentioned problems and/or disadvantages and to provide at least the advantages described below. Accordingly, an aspect of the disclosure is to provide a user equipment for reducing a time for beam tracking.

Additional aspects will be set forth in part in the description which follows and, in part, will be apparent from the description, or may be learned by practice of the presented embodiments.

In accordance with an aspect of the disclosure, an electronic device is provided. The electronic device includes a memory, a communication device including a plurality of N number of conductive plates arranged to form M number of beams, and at least one processor operatively connected to the memory and the communication device. The at least one processor may be configured to receive a synchronization signal block set including a plurality of synchronization signal blocks corresponding to a plurality of beams from a base station using at least some of the plurality of N conductive plates and select at least one of the M beams using the plurality of received synchronization signal blocks. Each of N and M may be an integer of greater than or equal to 2.

In accordance with another aspect of the disclosure, an electronic device is provided. The electronic device includes at least one memory, an antenna array including N number of antenna elements arranged to form M number of beams, and at least one processor operatively connected to the antenna array. The at least one memory may store instructions, when executed by the at least one processor, causes the at least one processor to, while a sequence of a plurality of directional beams, each of which has a different direction, is repeatedly transmitted from at least one base station, measure signal strength of each of the plurality of directional beams, by using the N antenna elements sequentially one by one for each sequence and select at least one of the M beams based at least in part on the measured result.

In accordance with another aspect of the disclosure, a user equipment is provided. The user equipment includes a memory, a communication device including a plurality of N number of conductive plates arranged to form M number of beams, and at least one processor operatively connected to the memory and the communication device. The at least one processor may be configured to receive a synchronization signal block set including L number of synchronization signal blocks corresponding to L number of transmit beams from a base station using each of at least some of the plurality of N conductive plates and select one of the L transmit beams using the plurality of received synchronization signal blocks. Each of M, N, and L may be an integer of greater than or equal to 2.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
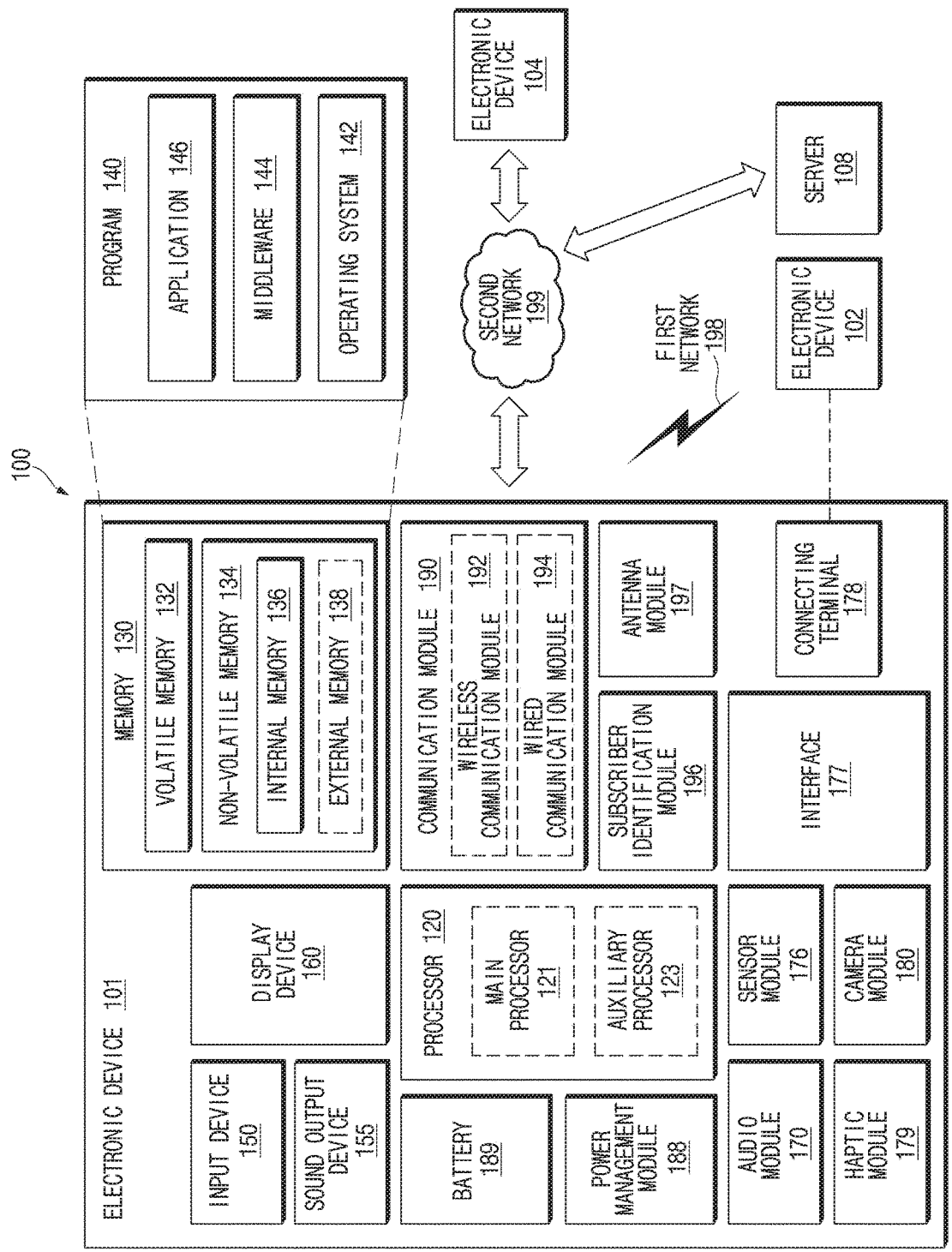
FIG. 1 is a block diagram illustrating an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
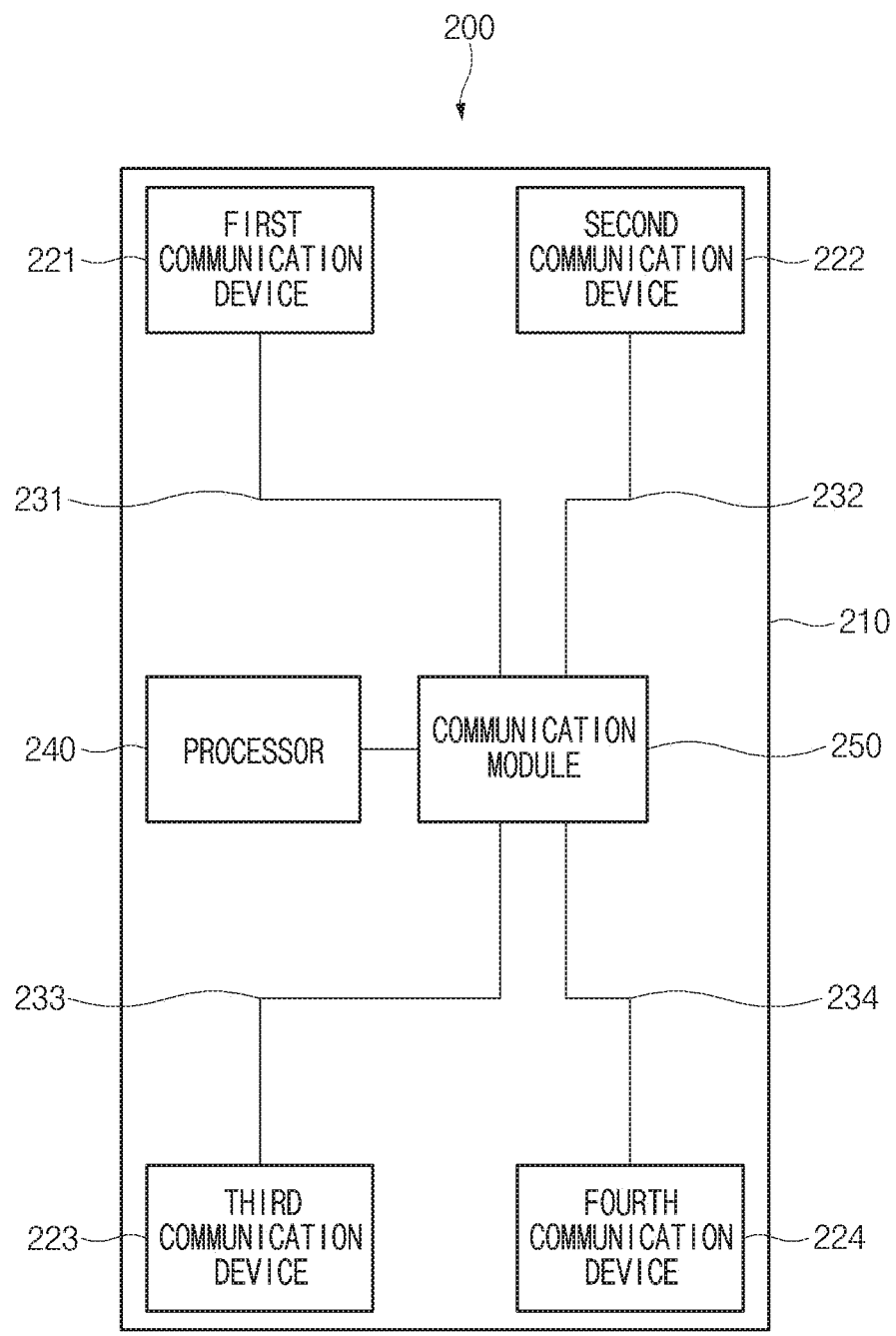
FIG. 2 is a block diagram illustrating an electronic device which supports 5G communication according to various embodiments of the disclosure.

FIG. 2 is a block diagram illustrating an electronic device 200 which supports 5th generation (5G) communication according to various embodiments of the disclosure.

Referring to FIG. 2, the electronic device 200 (e.g., an electronic device 101 of FIG. 1) may include a housing 210, a processor 240 (e.g., a processor 120 of FIG. 1), a communication module 250 (e.g., a communication module 190 of FIG. 1), a first communication device 221, a second communication device 222, a third communication device 223, a fourth communication device 224, a first conductive line 231, a second conductive line 232, a third conductive line 233, and/or a fourth conductive line 234.

According to an embodiment, the housing 210 may protect other components of the electronic device 200. The housing 210 may include a front plate, a back plate facing away from a direction opposite to the direction of the front plate, and a side membrane (or a metal frame) which is attached to the back plate or is integrated with the back plate and surrounds a space between the front plate and the back plate.

According to an embodiment, the electronic device 200 may include at least one communication device. For example, the electronic device 200 may include at least one of the first communication device 221, the second communication device 222, the third communication device 223, or the fourth communication device 224. For example, the first communication device 221, the second communication device 222, the third communication device 223, or the fourth communication device 224 may be referred to as an antenna structure or an antenna module.

According to an embodiment, the processor 240 may include one or more of a central processing unit (CPU), an application processor (AP), a graphic processing unit (GPU), an image signal processor of a camera, or a baseband processor (BP) (or a communication processor (CP)). According to an embodiment, the processor 240 may be implemented as a system on chip (SoC) or a system in package (SiP).

According to an embodiment, the communication module 250 may be electrically connected with at least one of the first communication device 221, the second communication device 222, the third communication device 223, or the fourth communication device 224 using at least one of the first conductive line 231, the second conductive line 232, the third conductive line 233, or the fourth conductive line 234. For example, the communication module 250 may be electrically connected with the first communication device 221, the second communication device 222, the third communication device 223, or the fourth communication device 224 using the first conductive line 231, the second conductive line 232, the third conductive line 233, or the fourth conductive line 234. The communication module 250 may include a baseband processor (BP), a radio frequency integrated circuit (RFIC), or an intermediate frequency integrated circuit (IFIC).

According to an embodiment, the communication module 250 may include a processor (e.g., a BP) independent of the processor 240 (e.g., an application processor (AP)). For example, when the processor 240 includes an AP and when the communication module 250 includes a BP, the electronic device 200 may further include an RFIC or an IFIC as a separate module (not shown). In this case, the RFIC or the IFIC may be electrically connected with the communication module 250 and may be electrically connected with the first communication device 221, the second communication device 222, the third communication device 223, and/or the fourth communication device 224 through the first conductive line 231, the second conductive line 232, the third conductive line 233, and/or the fourth conductive line 234. For another example, the BP and the RFIC or the IFIC may be integrally formed with the one communication module 250. According to another embodiment, the processor 240 may include an AP and a BP, and the communication module 250 may include an IFIC or an RFIC.

The first conductive line 231, the second conductive line 232, the third conductive line 233, or the fourth conductive line 234 may include, for example, a coaxial cable and/or a flexible printed circuit board (FPCB).

According to an embodiment, the communication module 250 may include at least one of a first BP (not shown) or a second BP (not shown). The electronic device 200 may further include one or more interfaces (e.g., an inter-processor communication channel) for supporting inter-chip communication between the first BP (or the second BP) and the processor 240. The processor 240 and the first BP or the second BP may transmit and receive data using an inter-chip interface (e.g., the inter-processor communication channel).

According to an embodiment, the first BP or the second BP may provide an interface for communicating with other entities. The first BP may support, for example, wireless communication for a first network (not shown). The second BP may support, for example, wireless communication for a second network (not shown).

According to an embodiment, the first BP or the second BP may form one module with the processor 240. For example, the first BP or the second BP may be integrally formed with the processor 240. For another example, the first BP or the second BP may be disposed in one chip or is formed in the form of an independent chip. According to an embodiment, the processor 240 and at least one BP (e.g., the first BP) may be integrally formed in one chip (an SoC chip), and the other BP (e.g., the second BP) may be formed in the form of an independent chip.

According to an embodiment, each of the first to fourth communication devices 221 to 224 may up-convert or down-convert a frequency. For example, the first communication device 221 may up-convert an intermediate frequency (IF) signal received through the first conductive line 231. For another example, the first communication device 221 may down-convert a mmWave signal received via an antenna array (not shown) and may transmit the down-converted signal using the first conductive line 231. According to an embodiment, each of the first to fourth communication devices 221 to 224 may directly transmit a signal to the processor 240 or may directly receive a signal from the processor 240, through each of the first to fourth conductive lines 231 to 234. For example, the communication module 250 may be omitted or may be integrated into the processor 240.

For example, operations of the communication module 250, described in the disclosure, may be performed by the processor 240 and/or the first to fourth communication devices 221 to 224.

According to an embodiment, the first network (not shown) or the second network (not shown) may correspond to a second network 199 of FIG. 1. According to an embodiment, each of the first network (not shown) and the second network (not shown) may include a 4th generation (4G) network and a 5th generation (5G) network. The 4G network may support, for example, a long term evolution (LTE) protocol defined by 3rd generation partnership project (3GPP). The 5G network may support, for example, a new radio (NR) protocol defined by 3GPP.

Figure 3:
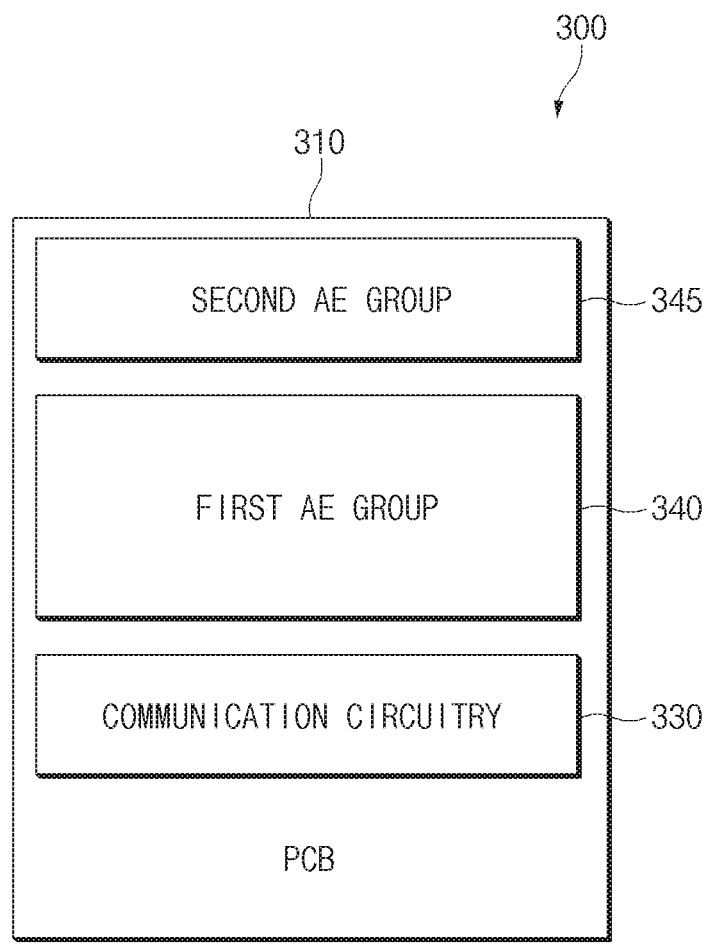
FIG. 3 is a block diagram illustrating a communication device according to various embodiments of the disclosure.

FIG. 3 is a block diagram illustrating a communication device 300 according to various embodiments of the disclosure.

Referring to FIG. 3, the communication device 300 (e.g., a first communication device 221, a second communication device 222, a third communication device 223, and/or a fourth communication device 224 of FIG. 2) may include a communication circuitry 330 (e.g., an RFIC) disposed in a printed circuit board 310, the PCB 310, or at least one antenna element (AE) group (e.g., a first AE group 340 or a second AE group 345). For example, the first AE group 340 and the second AE group 345 may be referred to as a first antenna array and a second antenna array, respectively. For example, each of AEs (e.g., conductive plates) included in the first AE group 340 and/or the second AE group 345 may be referred to as one non-directional antenna or one omni-directional antenna. For example, when at least some of the AEs included in the first AE group 340 and/or the second AE group 345 are used for a beamforming operation, the at least some AEs used for the beamforming operation may operate as one array antenna. In this case, the array antenna may form a beam having directionality in at least one specified direction.

According to an embodiment, the AE group 340 or the second AE group 345 is disposed in a first surface of the PCB 310, and the communication circuitry 330 may be located in a second surface of the PCB 310. The PCB 310 may include a coaxial cable connector or a board to board (B-to-B) connector for electrically connecting to another PCB (e.g., a PCB in which a communication module 250 of FIG. 2 is disposed) using a transmission line (e.g., a first conductive line 231, a second conductive line 232, a third conductive line 233, or a fourth conductive line 234 of FIG. 2 or a coaxial cable). The PCB 310 may be connected with the PCB where the communication module 250 is disposed and the coaxial cable using, for example, a coaxial cable connector. The coaxial cable may be used to transmit a transmit and receive IF or RF signal. For another example, power or other control signals may be transmitted through the B-to-B connector.

According to an embodiment, the first AE group 340 or the second AE group 345 may include a plurality of conductive plates (e.g., a plurality of AEs). Each of the plurality of AEs may include a patch antenna, a shorted patch antenna, a loop antenna, a notch antenna, a slot antenna, or a dipole antenna. According to an embodiment, the plurality of AEs which belong to the first AE group 340 may form one antenna array. For example, the communication device 300 may perform beamforming using the AEs of the first AE group 340. According to an embodiment, the plurality of AEs which belong to the second AE group 345 may form one array antenna. For example, the communication device 330 may perform beamforming using the AEs (e.g., patch antennas) of the second AE group 345. According to an embodiment, the communication device 300 may perform beamforming using the AEs of the first AE group 340 and the second AE group 345. According to an embodiment, each of the AEs which belong to the second AE group 345 may operate as a single antenna. For example, the AEs included in the second AE group 345 may be a dipole antenna.

According to an embodiment, the communication circuitry 330 may support a frequency band of 24 GHz to 30 GHz and/or a frequency band of 37 GHz to 40 GHz. According to an embodiment, the communication circuitry 330 may up-convert or down-convert a frequency. For example, referring to FIG. 2, a communication circuitry included in the first communication device 221 may up-convert an IF signal received via the first conductive line 231 from the communication module 250. For another example, the communication circuit 330 may down-convert a mmWave signal received via the first antenna array 340 or the second antenna array 345 included in the first communication device 221 and may transmit the down-converted signal to the communication module 250 using the first conductive line 231.

Figure 4:
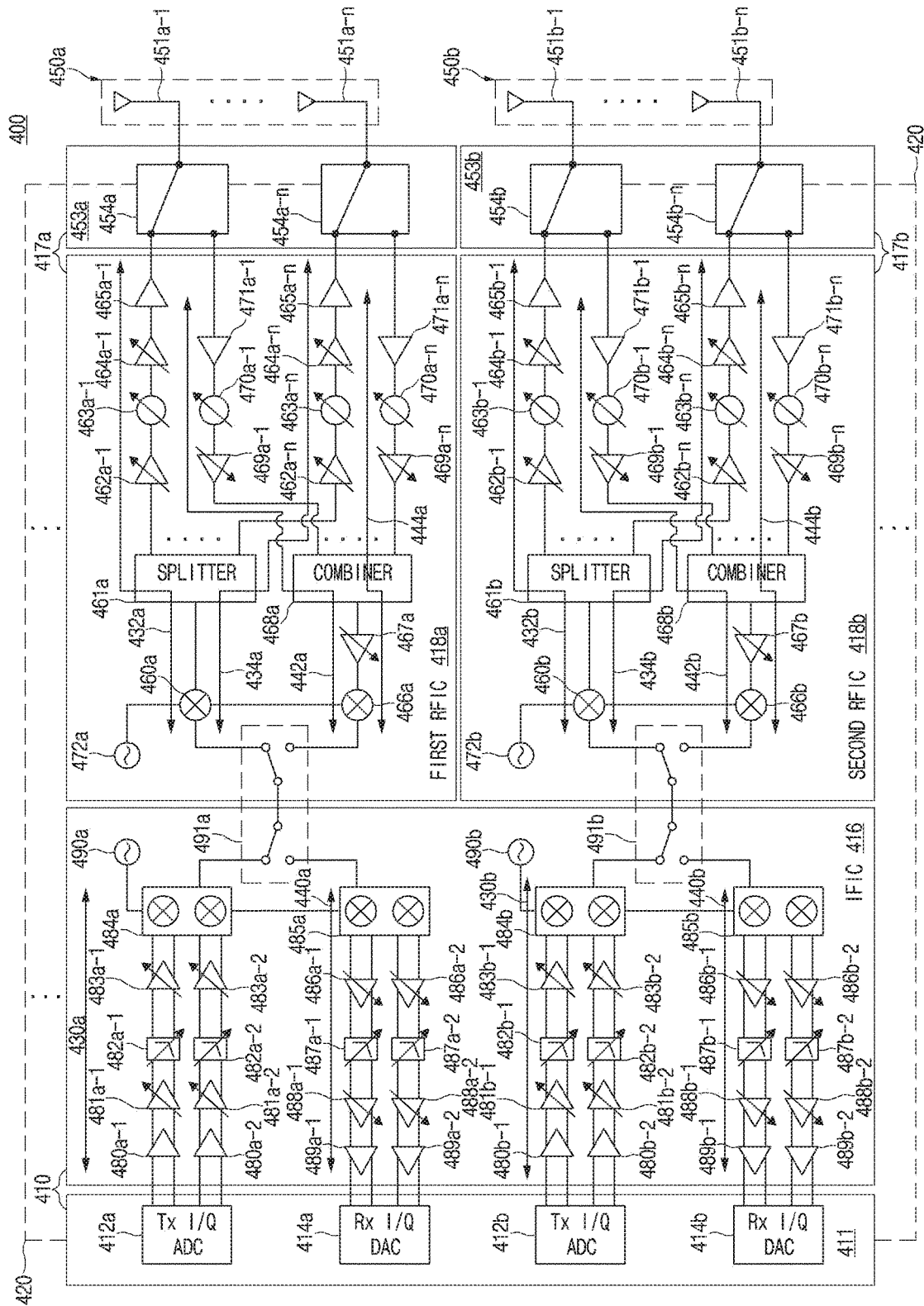
FIG. 4 is a drawing illustrating a communication system of an electronic device according to various embodiments of the disclosure.

FIG. 4 is a drawing illustrating a communication system 400 of an electronic device (e.g., an electronic device 200 of FIG. 2) according to various embodiments of the disclosure.

In a description of FIG. 4, described below, at least some of functions and structures of components, each of which has the same upper reference numeral (e.g., '480' in 480*a*-1) and has a different lower reference numeral (e.g., 'a' or 'a-1' in 480*a*-1), may be the same, and a description of a duplicated function may be partially omitted.

Referring to FIG. 4 illustrates the communication system 400 capable of having n (n is a natural number) number of chains and processing at least one data stream. The communication system 400 shown in FIG. 4 may refer to a component including a communication module 250, a first communication device 221, and a second communication device 222 among components of an electronic device 200 shown in FIG. 2. For example, a communication module 410 may correspond to the communication module 250 of FIG. 2. A first antenna module 417a may correspond to the first communication device 221 of FIG. 2. A second antenna module 417b may correspond to the second communication device 222 of FIG. 2.

According to an embodiment, the communication module 410 may include a CP 411 and an IFIC 416.

According to an embodiment, the CP 411 may control other components of the communication system 400 to transmit and/or receive a signal. For example, the CP 411 may be electrically connected with the IFIC 416, the first RFIC 418a, a second RFIC 418b, and/or path selection circuitries 453a and 453b to control the IFIC 416, the first RFIC 418a, a second RFIC 418b, and/or path selection circuitries 453a and 453b using a control signal through a control interface 420.

According to an embodiment, the CP 411 may include an analog to digital convertor (ADC) 412a and a digital to analog convertor (DAC) 414a, which are associated with the first antenna module 417a, and an ADC 412b and a DAC 414b, which are associated with the second antenna module 417b.

According to an embodiment, each of the ADCs 412a and 412b may convert a transmit signal from an analog signal to a digital signal. Each of the ADCs 412a and 412b may process an in-phase (I) component signal and a quadrature (Q) component signal of the transmit signal. The ADC 412a may process a signal to be transmitted via the first antenna module 417a, and the ADC 412b may process a signal to be transmitted via the second antenna module 417b.

According to an embodiment, each of the DACs 414a and 414b may convert a receive signal from a digital signal to an analog signal. Each of the DACs 414a and 414b may process an I component signal and a Q component signal of the receive signal. The DAC 414a may process a signal received via the first antenna module 417a, and the DAC 414b may process a signal received via the second antenna module 417b.

According to an embodiment, the IFIC 416 may convert the baseband signal obtained from the CP 411 into an IF signal or may convert the IF signal obtained from the first antenna module 417a (or the first RFIC 418a) and/or the second antenna module 417b (or the second RFIC 418b) into a baseband signal. The IF signal converted by the IFIC 416 may be input to the first antenna module 417a and/or the second antenna module 417b.

According to an embodiment, the IFIC 416 may include IF transmission chains 430a and 430b and IF reception chains 440a and 440b, which are configured to process a data stream in an IF frequency band. According to an embodiment, the first IF transmission chain 430a and the first IF reception chain 440a may be selectively connected with the first antenna module 417a (or the first RFIC 418a), and the second IF transmission chain 430b and the second IF reception chain 440b may be selectively connected with the second antenna module 417b (or the first RFIC 418b). Hereinafter, an operation principle for the first IF transmission chain 430a and the first IF reception chain 440a is applicable to an operation principle for the second IF transmission chain 430b and the second IF reception chain 440b.

According to an embodiment, the first IF transmission chain 430a may include at least one of buffers 480a-1 and 480a-2, first variable gain amplifiers (VGAs) 481a-1 and 481a-2, low pass filters (LPFs) 482a-1 and 482a-2, second VGAs 483a-1 and 483a-2, or a quadrature mixer 484a. Similar to the first IF transmission chain 430a, the second IF transmission chain 430b may include at least one of buffers 480b-1 and 480b-2, variable gain amplifiers (VGAs) 481b-1 and 481b-2, low pass filters (LPFs) 482b-1 and 482b-2, VGAs 483b-1 and 483b-2, or a quadrature mixer 484b.

According to an embodiment, each of the buffers 480a-1 and 480a-2 may play a buffering role when receiving a signal output from the CP 411 and may stably process the signal. The signal output from the CP 411 may be a balanced I/Q signal.

According to an embodiment, each of the first VGAs 481a-1 and 481a-2 may perform auto gain control (AGC). Each of the first VGAs 481a-1 and 481a-2 may perform AGC of a transmit signal under control of the CP 411.

According to an embodiment, each of the LPFs 482a-1 and 482a-2 may operate as a channel filter. Each of the LPFs 482a-1 and 482a-2 may operate a bandwidth of a balanced I/Q signal of a baseband as a cutoff frequency and may play a role as the channel filter. The cutoff frequency is variable.

According to an embodiment, the second VGAs 483a-1 and 483a-2 may perform AGC in a similar manner to the first VGAs 481a-1 and 481a-2 and may be the same or different from each other in amplification range.

According to an embodiment, the quadrature mixer 484a may up-convert the obtained balanced I/Q signal. The quadrature mixer 484a may receive the balanced I/Q signal and a signal generated by an oscillator 490a to perform an arithmetic operation, thus generating an IF signal.

According to an embodiment, the first IF reception chain 440a may include at least one of buffers 489a-1 and 489a-2, third VGAs 488a-1 and 488a-2, LPFs 487a-1 and 487a-2, fourth VGAs 486a-1 and 486a-2, or a quadrature mixer 485a. Similar to the first IF reception chain 440a, the second IF reception chain 440a may include at least one of buffers 489b-1 and 489b-2, VGAs 488b-1 and 488b-2, LPFs 487b-1 and 487b-2, VGAs 486b-1 and 486b-2, or a quadrature mixer 485b.

According to an embodiment, each of the buffers 489a-1 and 489a-2 may play a buffering role when transmitting a signal output from each of the third VGAs 488a-1 and 488a-2 to the CP 411 and may stably process the signal. The signal output from each of the third VGAs 488a-1 and 488a-2 may be a balanced I/Q signal.

According to an embodiment, each of the third VGAs 488a-1 and 488a-2 may perform VGA. Each of the third VGAs 488a-1 and 488a-2 may perform AGC of a receive signal under control of the CP 411. An amplification range by the third VGAs 488a-1 and 488a-2 may be the same or different from that of the second VGAs 483a-1 and 483a-2 and the first VGAs 481a-1 and 481-2.

According to an embodiment, each of the LPFs 487a-1 and 487a-2 may operate as a channel filter. Each of the LPFs 487a-1 and 487a-2 may operate a bandwidth of a balanced I/Q signal of a baseband as a cutoff frequency. The cutoff frequency is variable.

According to an embodiment, each of the fourth VGAs 486a-1 and 486a-2 may perform AGC. An amplification range by the fourth VGAs 486a-1 and 486a-2 may be the same or different from that of the third VGAs 488a-1 and 488a-2 and the second VGAs 483a-1 and 483a-2 and the first VGAs 481a-1 and 481a-2.

According to an embodiment, the quadrature mixer 485a may convert the obtained IF signal. The quadrature mixer 485a may down-convert the IF signal to generate a balanced I/Q signal. The quadrature mixer 485a may obtain an I component signal and a Q component signal using a signal obtained from the oscillator 490a and the IF signal.

According to an embodiment, the communication system 400 may include selection circuits 491a and 491b which selectively connect the IF transmission chains 430a and 430b or the IF reception chains 440a and 440b when connecting the IFIC 416 and the first RFIC 418a. For example, when transmitting a signal, the CP 411 may connect the first IF transmission chain 430a in the IFIC 416 and the first RF transmission chain 432a in the first RFIC 418a. For another example, when receiving a signal, the CP 411 may connect the first IF reception chain 440a in the IFIC 416 and the first RF reception chain 442a in the first RFIC 418a.

According to an embodiment, each of the selection circuits 491a and 491b may include at least one switch. For example, the selection circuit 491a may include a first switch in the IFIC 416 and may include a second switch in the first RFIC 418a. In this case, while transmitting a signal, the CP 411 may allow the first switch and the second switch to select the first IF transmission chain 430a and a first RF transmission chain 432a. While receiving a signal, the CP 411 may allow the first switch and the second switch to select the first IF reception chain 440a and a first RF reception chain 442a. It may be difficult to connect transmission lines between the IFIC 416 and the RFICs 418a and 418b when the IF frequency is high. When selectively connecting transmission and reception chains upon a time division duplex (TDD) operation using the switch, the number of the transmission lines may be reduced.

According to an embodiment, the communication module 410 may transmit or receive signals of different frequency bands via the first antenna module 417a and the second antenna module 417b. For example, the communication module 410 may transmit and/or receive a signal of a frequency band using a first antenna array 450a and may transmit and/or receive a signal of a second frequency band using a second antenna array 450b.

According to an embodiment, the first antenna module 417a (e.g., a communication device 300 of FIG. 3) may include the first RFIC 418a (e.g., a communication circuitry 330 of FIG. 3) and the first antenna array 450a (e.g., a first AE group 340 and/or a second AE group 345 of FIG. 3). In this case, the first RFIC 418a may be electrically connected to the first array 450a via the path selection circuitry 453a.

According to an embodiment, the second antenna module 417b may be the same or similar to the first antenna module 417a. For example, the second antenna module 417b may include the second RFIC 418b and the second antenna array 450b. The second antenna module 417b may be electrically connected to the second antenna array 450b via the path selection circuitry 453b. According to various embodiments, each of the first antenna module 417a and the second antenna module 417b may be implemented to include a plurality of antenna arrays. In an embodiment below, because the configuration of the second antenna module 417b is the same or similar to that of the first antenna module 417a, a duplicated description will be omitted for convenience of description.

According to an embodiment, the first RFIC 418a may convert the IF signal obtained from the IFIC 416 into an RF signal or may convert the RF signal received via n number of antennas 451a-1 to 451a-n (e.g., n is an integer of greater than or equal to 2) in the first antenna array 450a into an IF signal. The RF signal may be transmitted or received via the plurality of antennas 451a-1 to 451a-n. According to an embodiment, the second RFIC 418b may have the same or similar configuration to the first RFIC 418a and may perform the same or similar operation to the first RFIC 418a.

According to an embodiment, the first RFIC 418a may include first RF transmission chains 432a and 434a and first RF reception chains 442a and 444a, which are configured to process a data stream in an RF band. According to an embodiment, the first RF transmission chain 432a and the first RF reception chain 442a may be electrically connected with the antenna 45a-1 (e.g., a single antenna element), and the first RF transmission chain 434a and the first RF reception chain 444a may be electrically connected with the antenna 451a-n (e.g., a single antenna element).

According to an embodiment, the first RF transmission chain 432a may include at least one of a mixer 460a, a splitter 461a, a fifth VGA 462a-1, a phase shifter 463a-1, a sixth VGA 464a-1, and a power amplifier 465a-1. The first RF transmission chain 434a may include at least one of a mixer 460a, a splitter 461a, a VGA 462a-n, a phase shifter 463a-n, a VGA 464a-n, and a power amplifier 465a-n. The second RF transmission chain 432b may include at least one of a mixer 460b, a splitter 461b, a VGA 462b-1, a phase shifter 463b-1, a VGA 464b-1, and a power amplifier 465b-1. The second RF transmission chain 434b may include at least one of a mixer 460b, a splitter 461b, a VGA 462b-n, a phase shifter 463b-n, a VGA 464b-n, and a power amplifier 465b-n. Hereinafter, an operation principle of the components included in the first RF transmission chain 432a is applicable to the first RF transmission chain 434a, and a second RF transmission chain 432b and/or 434b in the same or similar manner.

According to an embodiment, the mixer 460a may convert the IF signal obtained from the IFIC 416 into an RF signal. The mixer 460a may convert the IF signal into an RF signal using a signal generated from an oscillator 472a. The oscillator 472a may be mounted inside or outside the first RFIC 418a. Similarly, the mixer 460b may convert the IF signal into an RF signal using a signal generated from an oscillator 472b. The oscillator 472b may be mounted inside or outside the first RFIC 418b.

According to an embodiment, the splitter 461a may split the input signal into a plurality of signals. The plurality of signals split by the splitter 461a may be delivered to the plurality of antennas 451a-1 to 451a-n, respectively.

According to an embodiment, the fifth VGA 462a-1 may perform AGC. The fifth VGA 462a-1 may obtain a control signal to perform AGC from the CP 411.

According to an embodiment, the sixth VGA 464a-1 may perform AGC. In FIG. 4, an embodiment is exemplified as there are the two VGAs in the first RF transmission chains 432a. However, embodiments are not limited thereto. For example, various modifications are possible in the number of VGAs. For another example, amplification ranges of the fifth VGA 462a-1 and the sixth VGA 464a-1 may be the same or different from each other.

According to an embodiment, the phase shifter 463a-1 may shift a phase of a signal. The phase shifter 463a-1 may obtain a control signal from the CP 411 and may shift a phase depending on the control signal. The phase shifter 463a-1 may shift a phase of an input signal depending on a beamforming angle (or direction).

According to an embodiment, the power amplifier 465a-1 may amplify a power of the signal output from the phase shifter 463a-1.

According to an embodiment, at least one of the fifth VGA 462a-1, the phase shifter 463a-1, the sixth VGA 464a-1, and the power amplifier 465a-1 may be mounted inside or outside the first RFIC 418a.

According to an embodiment, the first RF reception chain 442a may include at least one of a low noise amplifier (LNA) 471a-1, a phase shifter 470a-1, a seventh VGA 469a-1, a combiner 468a, an eighth VGA 467a, and a mixer 466a. The components may be mounted inside the first RFIC 418a. The first RF reception chain 444a may include at least one of a low noise amplifier (LNA) 471a-n, a phase shifter 470a-n, a VGA 469a-n, a combiner 468a, a VGA 467a, and a mixer 466a. The second RF reception chain 442b may include at least one of a low noise amplifier (LNA) 471b-1, a phase shifter 470b-1, a VGA 469b-1, a combiner 468b, a VGA 467b, and a mixer 466b. The components may be mounted inside the first RFIC 418a. The second RF reception chain 444b may include at least one of a low noise amplifier (LNA) 471b-n, a phase shifter 470b-n, a VGA 469b-n, a combiner 468b, a VGA 467b, and a mixer 466b. Hereinafter, an operation principle of the components included in the first RF reception chain 442a is applicable to a first RF reception chain 444a and a second RF reception chain 442b and/or 444b in the same or similar manner.

According to an embodiment, the LNA 471a-1 may perform low noise amplification of the signal received from the plurality of antennas 451a-1 to 451a-n.

According to an embodiment, the phase shifter 470a-1 may shift a phase of a signal depending on a beamforming angle. The phase shifter 470a-1 may arrange a signal phase between the plurality of first RF reception chains 442a and 444a within the same or similar range. The phase shifter 470a-1 may operate under control of the CP 411.

According to an embodiment, the seventh VGA 469a-1 may perform reception AGC. Various modifications according to various embodiments are possible in the number of seventh VGAs.

According to an embodiment, the combiner 468a may combine the signals obtained from the plurality of antennas 451a-1 to 451a-n. The signal output from the combiner 468a may be delivered to the mixer 466a via the eighth VGA 467a. The mixer 466a may convert the received RF signal into an IF signal. The mixer 466a may down-convert an RF signal using the signal obtained from the oscillator 472a.

According to an embodiment, the IF transmission chain and the RF transmission chain may be referred to as a transmission chain, and the IF reception chain and the RF reception chain may be referred to as a reception chain. For example, the first IF transmission chain 430a and the first RF transmission chain 432a (or the first RF transmission chain 434a) may be referred to as a first transmission chain, and the first IF reception chain 440a and the first RF reception chain 442a (or the first RF reception chain 444a) may be referred to as a first reception chain.

According to an embodiment, the plurality of antennas 451a-1 to 451a-n may form the antenna array 450a arranged with an array. For example, the antenna array 450a may operate as one array antenna. For example, the antenna array 450a may form a beam by mean of beamforming. Each of the plurality of antennas 451a-1 to 451a-n may be a non-directional antenna (e.g., a conductive plate). In FIG. 4, the antenna 451a-1 and the antenna 451a-n are shown in the first antenna module 417a. However, embodiments are not limited thereto. For example, various numbers of antennas may be arranged in the first antenna module 417a.

According to an embodiment, the plurality of antennas 451a-1 to 451a-n may deliver the obtained signal to the first RFIC 418a or may transmit the signal processed by the first RFIC 418a. The plurality of antennas 451a-1 to 451a-n may be electrically connected to the first RF transmission chains 432a and 442a or the first RF reception chains 434a and 444a in the first RFIC 418a. For example, the antenna 451a-1 may be electrically connected to the first RF transmission chain 432a or the first RF reception chain 434a, and the antenna 451a-n may be electrically connected to the first RF transmission chain 434a or the first RF reception chain 444a.

According to an embodiment, the plurality of antennas 451a-1 to 451a-n may be electrically connected to the first RF transmission chains 432a and 434a or the first RF reception chains 442a and 444a in the first RFIC 418a on a selective basis. To this end, the first antenna module 417a may include the path selection circuitry 453a with switches 454a to 454a-n. Similarly, the second antenna module 417b may include the path selection circuitry 453b with switches 454b to 454b-n. The path selection circuitry 453a may connect the plurality of antennas 451a-1 to 451a-n with the first RF transmission chains 432a and 434a while transmitting a signal and may connect the plurality of antennas 451a-1 to 451a-n with the first reception chains 442a and 444a while receiving a signal. The path selection circuitry 453a or an internal configuration thereof may operate under control of the CP 411. The path selection circuitry 453a may operate to transmit or receive a signal over time in a time division duplex (TDD) system. The plurality of antennas 451a-1 to 451a-n may be connected to a duplexer (not shown). In this case, the communication system 4000 may operate in a frequency division duplex (FDD) mode.

According to an embodiment, the CP 411 may control at least one of the IFIC 416, the first RFIC 481a, the second RFIC 418b, and the path selection circuitries 453a and 453b through the control interface 420. The control interface 420 may be a communication interface including at least one of, for example, a mobile industry processor interface (MIPI), an inter-integrated circuit (I2C), a peripheral component interconnect express (PCIe), a universal asynchronous receiver/transmitter (UART), a universal serial bus (USB), and/or a general-purpose input/output (GPIO).

Although not illustrated in FIG. 4, an integrated circuit (e.g., the first communication circuitry 416 or the RFICs 418a and 418b) may include a control interface for delivering a control signal.

Figure 5:
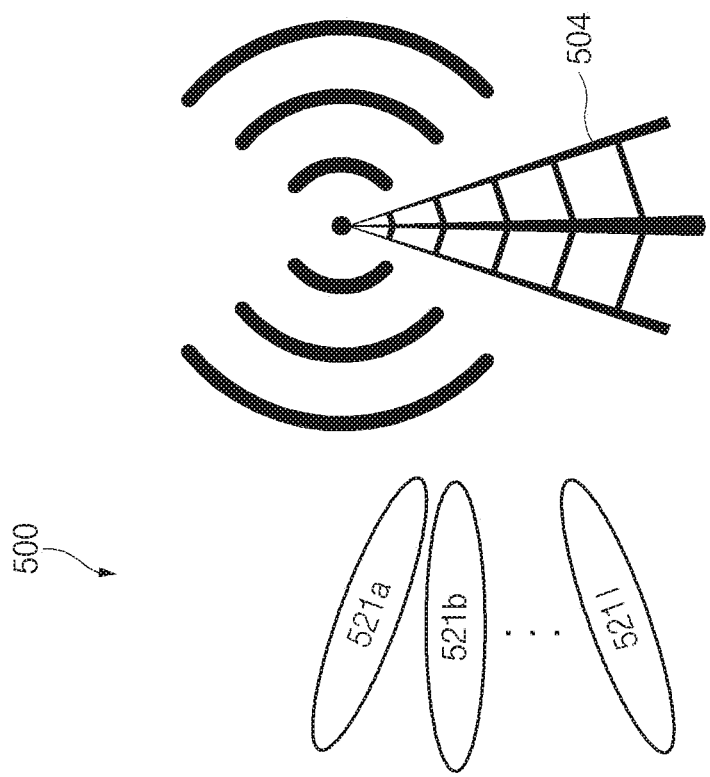
FIG. 5 is a drawing illustrating beam tracking of an electronic device according to various embodiments of the disclosure.
Figure 5:
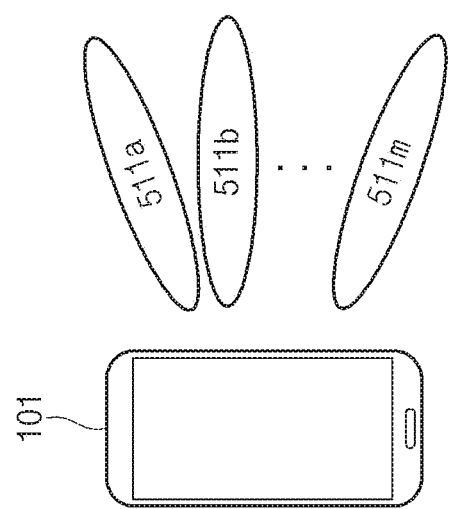

FIG. 5 is a drawing illustrating a beam tracking environment 500 of an electronic device 101 according to various embodiments of the disclosure.

According to various embodiments, the electronic device 101 may correspond to a user equipment which supports 5G mobile communication (e.g., NR). The electronic device 101 may form M number of beams 511a to 511m (where each of m and M is an integer of greater than or equal to 2). For example, referring to FIG. 4, the electronic device 101 may form a plurality of beams 511a to 511m by applying a phase to a plurality of antennas 451a-1 to 451a-n using phase shifters 470a-1 to 470-n electrically connected with a first antenna array 450a of FIG. 4. Similarly, the electronic device 101 may form beamforming using a second antenna array 450b of FIG. 4. In a description below, for convenience of description, it is assumed that the electronic device 101 may perform beamforming using the first antenna array 450a of FIG. 4. However, the electronic device 101 may perform beamforming using the second antenna 450b and/or another antenna array (not shown).

According to various embodiments, an external electronic device 504 may be a base station which performs wireless communication depending on the 3GPP mobile communication specification. For example, the external electronic device 504 may be a base station which supports 5G (e.g., NR) mobile communication. According to an embodiment, the external electronic device 504 may form L (where L is an integer of greater than or equal to 2) number of beams 521a to 521l (where 1 is an integer of greater than or equal to 2). For example, the external electronic device 504 may form the L beams 521a to 521l using a one-dimensional (1D) antenna array. The L beams 521a to 521l may be spatially multiplexed in different directions on a two-dimensional (2D) space. For example, the external electronic device 504 may form the L beams 521a to 521l using a 2D antenna array (not shown). The L beams 521a to 521l may be spatially multiplexed in different directions on a 3D space.

According to an embodiment, the external electronic device 504 may perform beam sweeping such that the electronic device 101 detects an optimal beam. For example, the external electronic device 504 may transmit a synchronization signal block set including a synchronization signal block (e.g., a synchronization signal (e.g., a primary synchronization signal (PSS), a secondary synchronization signal (SSS), and/or a physical broadcast channel (PBCH))), sequentially using the L beams 521a to 521l. For example, the external electronic device 504 may transmit a synchronization signal block using the respective beams 521a to 521l at a different time on a time domain. The external electronic device 504 may perform sequential synchronization signal block transmission by sequentially transmitting synchronization signal blocks for L beams in a manner to transmit the synchronization signal block using the beam 521a and transmit the synchronization signal block using the beam 521b. For example, sequential synchronization signal block transmission using the beams 521a to 521l may be called a synchronization signal burst or a synchronization signal block set.

According to an embodiment, the electronic device 101 may receive information about a synchronization signal block set from the external electronic device 504. For example, the electronic device 101 may receive information about transmission of a synchronization signal block and/or a synchronization signal block set using higher layer signaling (e.g., radio resource control (RRC) signaling) received from the external electronic device 504. For example, the electronic device 101 may receive information about transmission of a synchronization signal block set and/or a synchronization signal block by receiving a master information block (MIB) and/or a system information block (SIB) from the external electronic device 504. For example, the information about the synchronization signal block set and/or the synchronization signal block may include information about a period of the synchronization signal block set, information about a location of the synchronization signal block in the period of the synchronization signal block set, and/or information about a frequency offset of the synchronization signal block. For example, the electronic device 101 may receive a plurality of synchronization signal blocks from the external electronic device 504 using the information about the synchronization signal block set or the synchronization signal block.

According to an embodiment, one synchronization signal block set may include a specified number of synchronization signal blocks transmitted in a specified period. The respective synchronization signal blocks may correspond to different beams. The synchronization signal block set may be repeatedly transmitted at a specified period, and synchronization signal blocks in each synchronization signal block set may have indexes which increase sequentially from "0". For example, the electronic device 101 may obtain an index of each synchronization signal block using a reference signal (e.g., a demodulation reference signal (DMRS)) and a payload of a PBCH transmitted together with the synchronization signal block. For example, the electronic device 101 may report an index of a synchronization signal block corresponding to one beam (e.g., an optimal beam) determined through beam tracking to the external electronic device 504.

According to an embodiment, the electronic device 101 may determine a combination (e.g., a beam pair) of a transmit beam and a receive beam by means of beam tracking. For example, the electronic device 101 may receive a synchronization signal block set and may measure received intensity of each of synchronization signal blocks in the synchronization signal block set. For example, the electronic device 101 may measure a receive power of each of the synchronization signal blocks. For example, the electronic device 101 may determine a combination of a transmit beam and a receive beam, each of which has the highest received intensity, or a combination of a transmit beam and a receive beam, each of which is estimated as having the highest received intensity.

Figure 6:
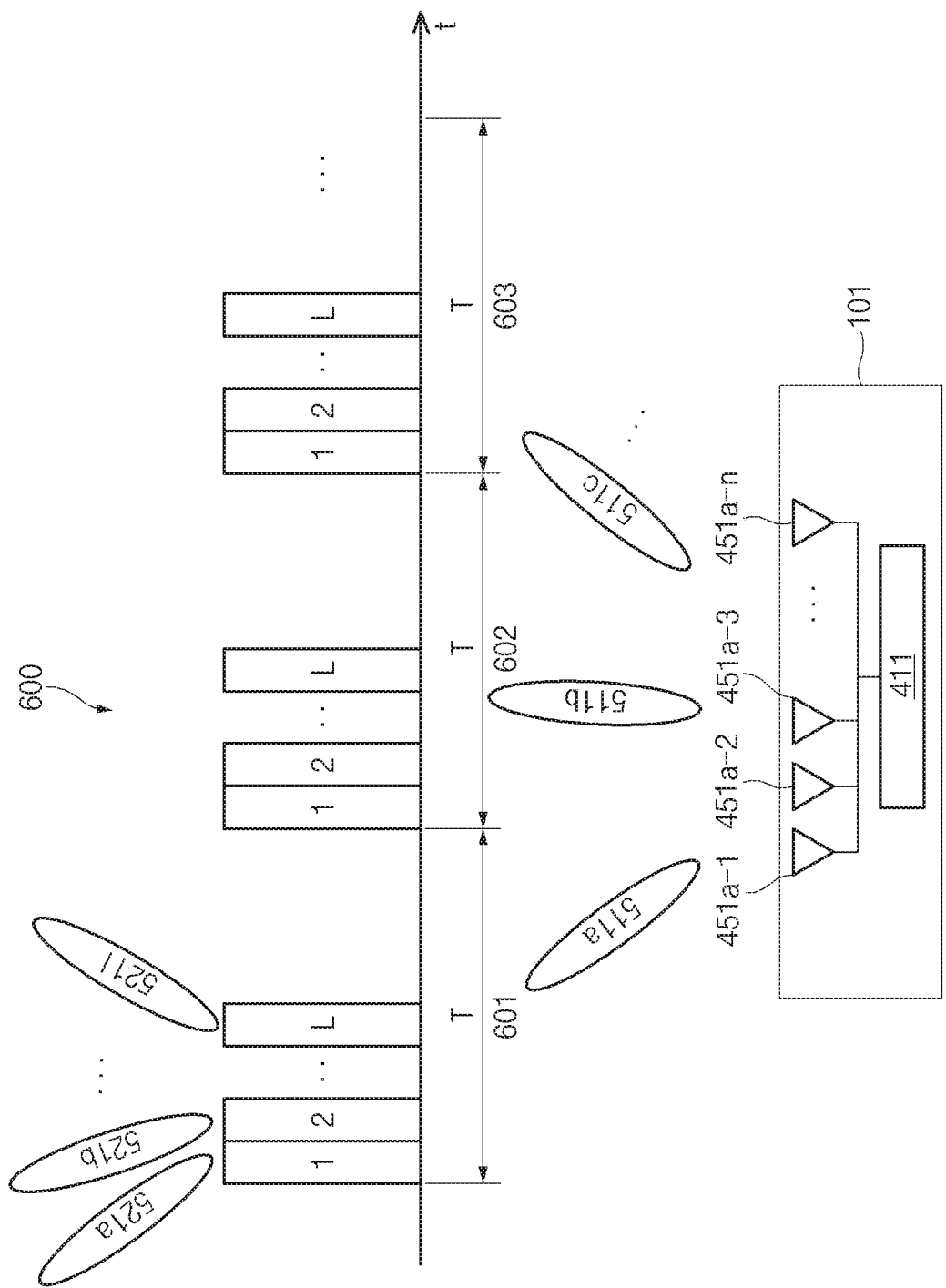
FIG. 6 is a drawing illustrating beamforming-based synchronization signal block reception of an electronic device according to various embodiments of the disclosure.

FIG. 6 is a drawing illustrating a beamforming-based synchronization signal block reception 600 of an electronic device 101 according to various embodiments of the disclosure.

Referring to FIG. 6, an external electronic device (e.g., an external electronic device 504 of FIG. 5) may transmit L number of synchronization signal blocks over a specified period T (e.g., a synchronization signal block set period). In FIG. 6, for example, synchronization signal blocks 1 to L may correspond to beams 521a to 521l, respectively. In FIG. 6, it is shown that the L synchronization signal blocks are consecutively transmitted. However, embodiments are not limited thereto. For example, the L synchronization signal blocks may be transmitted at a specified spacing on a time domain. In FIG. 6, it is shown that the L synchronization signal blocks are transmitted from the beginning of the synchronization signal block set period T. However, embodiments are not limited thereto. For example, the L synchronization signal blocks may be transmitted after a specified time (e.g., a specified offset) after the beginning of the period T.

According to various embodiments, an electronic device 101 may perform beamforming using N number of antennas 451a-1, 451a-2, 451a-3 to 451a-n (e.g., antenna elements). According to an embodiment, the electronic device 101 may perform analog beamforming using the N antennas 451a-1 to 451a-n. For example, the electronic device 101 may track beams from the external electronic device (e.g., the external electronic device 504 of FIG. 5) by applying beamforming for the N antennas 451a-1 to 451a-n connected to one reception chain of a CP 411. According to an embodiment, the electronic device 101 may form a beam 511a using the N antennas 451a-1 to 451a-n in a first period 601 and may receive L number of synchronization signal blocks using the formed beam 511a. The electronic device 101 may receive L number of synchronization signal blocks using a beam 511b in a second period 602 and may receive L number of synchronization signal blocks using a beam 511c in a third period 603. For example, the electronic device 101 may receive L number of synchronization signal blocks in one synchronization signal block set for each of M number of beams to determine a beam combination (e.g., a combination of a beam of the external electronic device 504 and a beam of the electronic device 101). For example, the electronic device 101 may receive synchronization signal blocks using the M beams and may measure received intensity (e.g., a receive power) of each of the synchronization signal blocks. For example, the electronic device 101 may determine a combination (e.g., a beam pair) of a transmit beam and a receive beam based at least on a synchronization signal block having the highest intensity. The electronic device 101 may determine one of the M beams, indicating optimal performance, and at least one of L number of beams. According to an embodiment, the electronic device 101 may transmit information (e.g., beam index information) about a selected beam of the external electronic device 504 to the external electronic device 504. In this case, the electronic device 101 may need an M*T time to obtain information about all beam combinations (e.g., for beam tracking).

According to an embodiment, the external electronic device 504 may transmit a synchronization signal using one or more symbols (e.g., an orthogonal frequency division multiplexing (OFDM) symbol). For example, the external electronic device 504 may transmit a synchronization signal (e.g., a primary synchronization signal (PSS) and/or a secondary synchronization signal (SSS)) having a length of K number of symbols (e.g., orthogonal frequency division multiplexing (OFDM) symbols). For example, the external electronic device 504 may refer to an l-th beam $w_l$ (e.g., the beam 521l) among L number of beams generated using 0 number of antennas. The external electronic device 504 may transmit a k-th symbol x [k] of a synchronization signal block to the electronic device 101 over a channel H from the external electronic device 504 to the electronic device 101 using the beam $w_l$. For example, the electronic device 101 may receive the k-th symbol x[k] from the external electronic device 504 using an m-th beam $u_m$ generated using the N antennas 451a-1 to 451a-n. In this case, a signal $z_{m,l}[k]$ in which the CP 411 of the electronic device 101 receives a k-th symbol of a l-th beam from the external electronic device 504 using the m-th beam formed using the N antennas may be arranged as Equation 1 below.

$$z_{m,l}[k] = u_m^T(Hw_l x[k] + n[k]) = [u_{m,1} \ldots u_{m,N}] \left( \begin{bmatrix} h_{1,1} & \ldots & h_{1,O} \\ \vdots & \ddots & \vdots \\ h_{N,1} & \ldots & h_{N,O} \end{bmatrix} \begin{bmatrix} w_{l,1} \\ \vdots \\ w_{l,O} \end{bmatrix} x[k] + \begin{bmatrix} n_1[k] \\ \vdots \\ n_N[k] \end{bmatrix} \right)$$ Equation 1

In Equation 1 above, n[k] denotes the noise associated with the k-th symbol, $u_{m,n}$ denotes the weight (e.g., a complex number weight) applied to the n-th antenna (e.g., the antenna 451a-n of FIG. 4) depending on beamforming corresponding to the m-th beam, $h_{n,o}$ denotes the channel from the o-th antenna of the external electronic device 504 to the n-th antenna (e.g., the antenna 451a-n) of the electronic device 101, $w_{l,o}$ denotes the weight applied to the o-th antenna of the external electronic device 504 depending on beamforming corresponding to the l-th beam, and $n_n[k]$ denotes the noise received from the n-th antenna associated with the k-th symbol.

According to an embodiment, the electronic device 101 may determine a beam combination based on correlation between the received synchronization signal block and the transmitted synchronization signal block. For example, the electronic device 101 may determine an optimal beam combination (m', l') using Equation 2 below.

$$(m', l') = \underset{m \in \{1,\ldots,M\}, l \in \{1,\ldots,L\}}{\operatorname{argmax}} \left| \sum_{k=1}^{K} x*[k] z_{m,l}[k] \right|^2$$ Equation 2

For example, the electronic device 101 may determine a beam combination having the highest correlation between the transmit signal and the receive signal as an optimal beam.

According to various embodiments, the electronic device 101 may receive the L beams 521a to 521l using the respective beams 511a to 511m and may determine a combination of beams having the best performance. For example, the electronic device 101 may receive synchronization signal blocks using the M beams and may measure received intensity (e.g., a receive power) of each of the synchronization signal blocks. For example, the electronic device 101 may determine a combination (e.g., a beam pair) of a transmit beam and a receive beam based at least on a synchronization signal block having the highest intensity.

According to an embodiment, when the number M of beams capable of being formed using N number of antennas is less than or equal to the number N of receive antennas, the electronic device 101 may perform beam tracking by applying each beamforming and receiving a plurality of synchronization signal blocks (e.g., a synchronization signal block set). Embodiments of the disclosure are not limited to being dependent on the number of beams and the number of antennas. For example, the electronic device 101 according to embodiments of the disclosure may perform the embodiments of the disclosure independently of the number of antennas and the number of beams.

Figure 7:
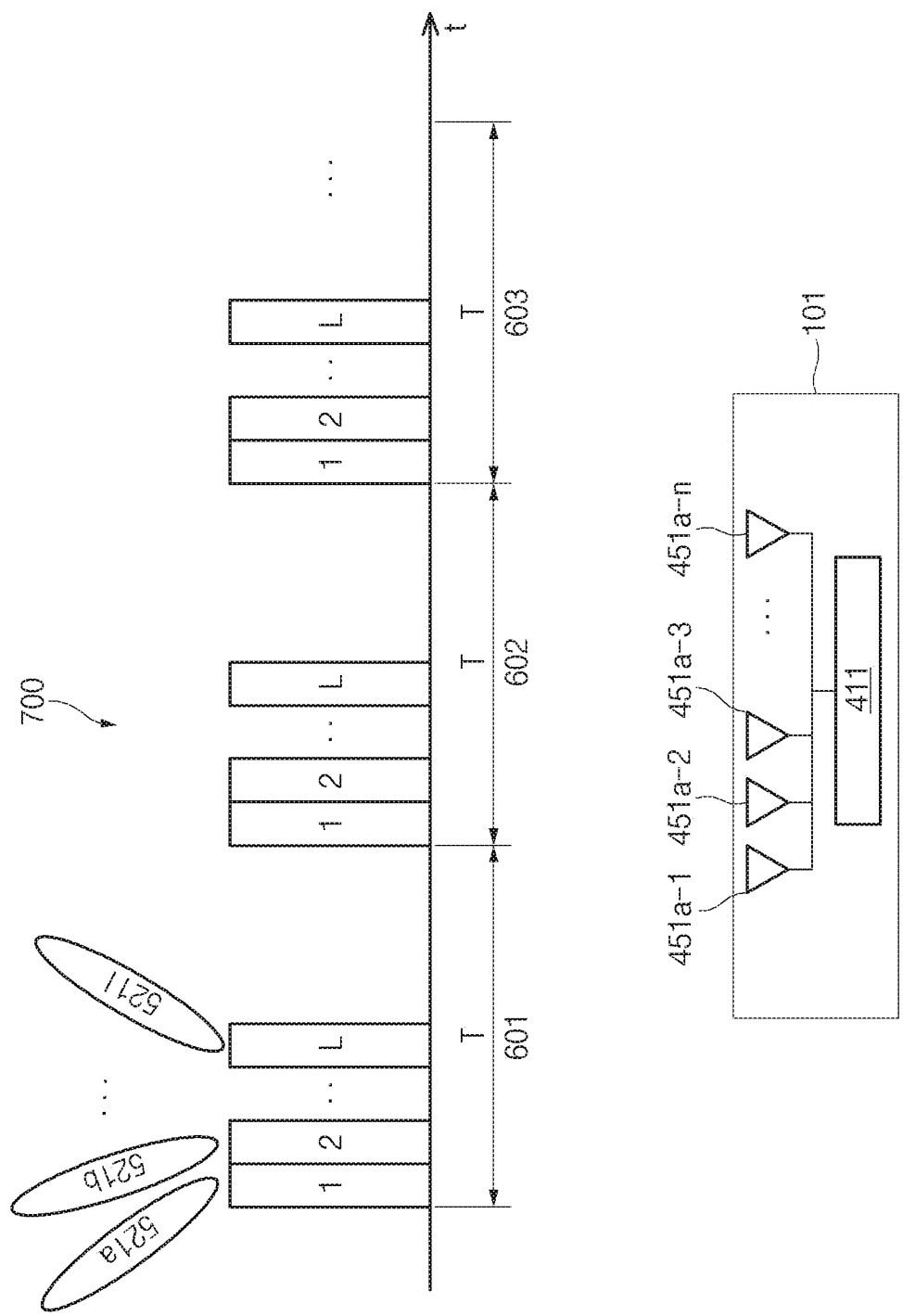
FIG. 7 is a conceptual diagram illustrating beam tracking of an electronic device according to various embodiments of the disclosure.

FIG. 7 is a conceptual diagram 700 illustrating beam tracking of an electronic device 101 according to various embodiments of the disclosure.

Referring to FIG. 7, an external electronic device (e.g., an external electronic device 504 of FIG. 5) may transmit L number of synchronization signal blocks over a specified period T (e.g., a synchronization signal block set period). In FIG. 7, for example, synchronization signal blocks 1 to L may correspond to L number of beams (e.g., beams 521a to 521l), respectively. The detailed description associated with the operation of the external electronic device 504 is provided with reference to FIG. 6.

According to various embodiments, the electronic device 101 may perform beam tracking using N number of antennas 451a-1 to 451a-n. For example, the electronic device 101 may track beams from the external electronic device (e.g., the external electronic device 504 of FIG. 5) without applying beamforming for the N antennas 451a-1 to 451a-n connected to one reception chain of a CP 411. According to an embodiment, the electronic device 101 may receive L number of synchronization signal blocks by using each of the N antennas 451a-1 to 451a-n in a different time. For example, the electronic device 101 may receive L number of synchronization signal blocks using the antenna 451a-1 in a first period 601, may receive L number of synchronization signal blocks using the antenna 451a-2 in a second period 602, and may receive L number of synchronization signal blocks using the antenna 451a-3 in a third period 603.

According to various embodiments, the electronic device 101 may determine a beam combination (e.g., a combination of a beam of the external electronic device 504 and a beam of the electronic device 101) by receiving one synchronization signal block set for each of the N antennas 451a-1 to 451a-n. For example, the electronic device 101 may sequentially enable the N antennas 451a-1 to 451a-n and may receive a synchronization signal block set using the enabled antenna. The electronic device 101 may receive a synchronization signal block set using each antenna and may determine a beam combination based on correlation between a beam of the external electronic device 504 and a beam of the electronic device 101 using the received synchronization signal block set. For example, in receiving a synchronization signal block set using each antenna, the electronic device 101 may fail to apply a separate phase to a phase shifter (e.g., a phase shifter 470a-1 of FIG. 4) corresponding to each antenna (e.g., the antenna 451a-1) or may disable the phase shifter to receive the synchronization signal block set.

For example, when a signal corresponding to a transmit beam 1 received using an m-th receive beam $u_m$ (i.e., a signal including noise received over a channel H from the external electronic device 504 to the electronic device 101) in the N antennas 451a-1 to 451a-n is $y_l$, the Equation 1 may be arranged as below.

$$z_{m,l}[k] = [u_{m,1} \ldots u_{m,N}] \begin{bmatrix} y_{l,1}[k] \\ \vdots \\ y_{l,N}[k] \end{bmatrix} = u_m^T y_l[k] \quad \text{Equation 3}$$

In Equation 3, $y_{l,n}$ denotes the signal corresponding to the beam 1 received from the n-th antenna of the electronic device 101. Substituting Equation 3 above into Equation 2 above is as below.

$$(m', l') = \underset{m \in \{1,\ldots,M\}, l \in \{1,\ldots,L\}}{\mathrm{argmax}} \left| \sum_{k=1}^{K} x*[k] u_m^T y_l[k] \right|^2 = \quad \text{Equation 4}$$

$$\underset{m \in \{1,\ldots,M\}, l \in \{1,\ldots,L\}}{\mathrm{argmax}} \left| \sum_{k=1}^{N} u_{m,n} \sum_{k=1}^{K} x*[k] y_{l,n}[k] \right|^2$$

For example, the electronic device 101 may obtain $\Sigma_{k=1}^{K} x*[k] y_{l,n}[k]$ by receiving synchronization signal blocks using each antenna without applying beamforming to the N antennas 451a-1 to 451a-n. Furthermore, all $u_{m,n}$ for m and n may be obtained from a predetermined weight (e.g., a beamforming vector). Thus, according to theorems of Equations 1 to 4 above, the electronic device 101 may fail to perform beamforming and may perform beam tracking having the same result as when applying beamforming using the received synchronization signal blocks. For example, as described in Equation 4 above, the electronic device 101 may determine a beam combination using synchronization signal blocks received using each antenna and a specified beamforming vector. For example, the electronic device 101 may receive synchronization signal blocks without applying beamforming and may measure received intensity (e.g., a receive power) of each of the synchronization signal blocks. For example, the electronic device 101 may determine a combination (e.g., a beam pair) of a transmit beam and a receive beam, which are estimated to have the highest intensity, based at least on received intensity of a synchronization signal block.

According to an embodiment, the electronic device 101 may perform beam tracking without applying beamforming, based at least on the number of antennas. For example, the number N of antennas of the electronic device 101 is less than the number M of beams capable of being generated by the N antennas 451a-1 to 451a-n, the electronic device 101 may perform beam tracking without applying beamforming. For another example, the electronic device 101 may perform beam tracking without applying beamforming irrespective of the number of antennas.

In case of beam tracking which does not apply beamforming, a time taken to perform the beam tracking may decrease from M*T to N*T. For another example, when the number N of the antennas of the electronic device 101 is greater than or equal to the number M of the beams, as described in detail with reference to FIG. 6, the electronic device 101 may apply beamforming to perform beam tracking.

According to various embodiments, the electronic device 101 may receive a synchronization signal block set using only some of the N antennas 451a-1 to 451a-n and may perform beam tracking using the received synchronization signal blocks. For example, the electronic device 101 may reduce a time for beam tracking using only some of the N antennas 451a-1 to 451a-n rather than all of the N antennas 451a-1 to 451a-n.

According to an embodiment, the electronic device 101 may perform beam tracking using V (V<N) number of antennas. In this case, the electronic device 101 may receive a synchronization signal block set sequentially using the V antennas and may determine a beam combination using the received synchronization signal block set. For example, the electronic device 101 may perform beam tracking using only an antenna which belongs to subset a (e.g., a={$a_1, a_2, \ldots, a_v$}) among the N antennas 451a-1 to 451a-n. For example, in case of a 1D array antenna in which the N antennas 451a-1 to 451a-n are arranged in line, the electronic device 101 may perform beam tracking using the V antennas among the N antennas 451a-1 to 451a-n. For example, in case of a 2D array antenna in which the N antennas 451a-1 to 451a-n are arranged in the form of a matrix configured with K1 number of rows and K2 number of columns, the electronic device 101 may perform beam tracking using V1 number of antennas of each row and V2 number of antennas of each column among the N antennas 451a-1 to 451a-n. For example, the multiplication of V1 and V2 may be the same as V, and V may be set less than N.

According to an embodiment, the electronic device 101 may perform beam tracking by receiving a synchronization signal block set P (where P is an integer of greater than or equal to 1) times using each of the N antennas (e.g., antennal elements). For example, the electronic device 101 may perform beam tracking using each of the antenna 451a-1, the antenna 451a-3, and the antenna 451a-n. According to an embodiment, the electronic device 101 may receive a synchronization signal block set repeatedly for each of at least some antennas. For example, the electronic device 101 may enable one antenna to receive a synchronization signal block set P times and may enable a subsequent antenna to receive a synchronization signal block set P times. For example, when P is 2, the electronic device 101 may receive synchronization signal block sets corresponding to two periods (e.g., a first period 601 and a second period 602) using the antenna 451a-1, may receive synchronization signal block sets corresponding to two periods (e.g., a third period 603 and a fourth period (not shown)) using the antenna 451a-3, and may receive synchronization signal block sets corresponding to two periods (e.g., a fifth period (not shown) and a sixth period (not shown)) using the antenna 451a-n. For another example, the electronic device 101 may control antennas to receive a synchronous signal block set P times with respect to each of the N antennas in a manner to enable one antenna to receive a synchronization signal block set once and to sequentially enable a subsequent antenna to receive a synchronization signal block set. For example, when P is 2, the electronic device 101 may receive a synchronization signal block set corresponding to the first period 601 using the antenna 451a-1, may receive a synchronization signal block set corresponding to the second period 602 using the antenna 451a-3, may receive a synchronization signal block set corresponding to the third period 603 using the antenna 451a-n, may receive a synchronization signal block set corresponding to the fourth period using the antenna 451a-1, may receive a synchronization signal block set corresponding to the fifth period using the antenna 451a-3, and may receive a synchronization signal block set corresponding to the sixth period using the antenna 451a-n. According to an embodiment, the multiplication of the number N of antennas used for beam tracking and the number of times P of repetition may be set less than the number M of beams by the N antennas 451a-1 to 451a-n.

According to an embodiment, the electronic device 101 may perform beam tracking by receiving a synchronization signal block set P (where P is an integer of greater than or equal to 1) times using each of V (V<N) number of antennas among the N antennas. For example, when V is 3, the electronic device 101 may perform beam tracking using each of the antenna 451a-1, the antenna 451a-3, and the antenna 451a-n. According to an embodiment, the electronic device 101 may receive a synchronization signal block set repeatedly for each of at least some antennas. For example, the electronic device 101 may enable one antenna to receive a synchronization signal block set P times and may enable a subsequent antenna to receive a synchronization signal block set P times. For example, when P is 2, the electronic device 101 may receive synchronization signal block sets corresponding to two periods (e.g., the first period 601 and the second period 602) using the antenna 451a-1, may receive synchronization signal block sets corresponding to two periods (e.g., the third period 603 and the fourth period (not shown)) using the antenna 451a-3, and may receive synchronization signal block sets corresponding to two periods (e.g., the fifth period (not shown) and the sixth period (not shown)) using the antenna 451a-n. For another example, the electronic device 101 may control antennas to receive a synchronization signal block set P times for each of V number of antennas in a manner to enable one antenna to receive a synchronization signal block set once and to sequentially enable a subsequent antenna to receive a synchronization signal block set. For example, when P is 2, the electronic device 101 may receive a synchronization signal block set corresponding to the first period 601 using the antenna 451a-1, may receive a synchronization signal block set corresponding to the second period 602 using the antenna 451a-3, may receive a synchronization signal block set corresponding to the third period 603 using the antenna 451a-n, may receive a synchronization signal block set corresponding to the fourth period using the antenna 451a-1, may receive a synchronization signal block set corresponding to the fifth period using the antenna 451a-3, and may receive a synchronization signal block set corresponding to the sixth period using the antenna 451a-n. According to an embodiment, the multiplication of the number V of antennas used for beam tracking and the number of times P of repetition may be set less than the number M of beams by the N antennas 451a-1 to 451a-n.

For example, the electronic device 101 may perform beam tracking by receiving a synchronization signal block set repeatedly P (where P is an integer of greater than or equal to 1) times using only an antenna which belongs to subset a (e.g., a={$a_1, a_2, \ldots, a_v$}) among the N antennas 451a-1 to 451a-n. For example, the electronic device 101 may determine a beam combination using Equation 5 below.

$$(m', l') = \operatorname*{argmax}_{m \in \{1,\ldots,M\}, l \in \{1,\ldots,L\}} \left| \sum_{v=1}^{V} \sum_{p=1}^{P} u_{m,a_v(p)} \sum_{k=1}^{K} x*[k] y_{l,a_v(p)}[k] \right|^2 \quad \text{Equation 5}$$

In Equation 5 above, $a_v(p)$ denotes the p-th reception by the antenna $a_v$.

According to various embodiments, the electronic device 101 may use a different beam tracking method based on an electric field situation. For example, the electric field situation may include a receive power (e.g., a reference signal received power (RSRP)) of a signal received from the external electronic device 504 or whether there is a line of sight (LoS) environment. According to an embodiment, when the electric field situation is good (e.g., when the receive power corresponds to a first range and/or when the electronic device 101 is in an LoS environment with the external electronic device 504), the electronic device 101 may receive a synchronization signal block set using only an antenna which belongs to subset a (e.g., a={$a_1, a_2, \ldots, a_v$}) among the N antennas 451a-1 to 451a-n to perform beam tracking. For example, when the electric field situation is bad (e.g., when the electric field situation corresponds to a specified second range and/or when the electronic device 101 is not in the LoS environment with the external electronic device 504), the electronic device 101 may receive a synchronization signal block set using all the N antennas 451a-1 to 451a-n to perform beam tracking. For another example, when the electric field situation is bad (e.g., when the electric field situation corresponds to the specified second range and/or when the electronic device 101 is not in the LoS environment with the external electronic device 504), the electronic device 101 may receive a synchronization signal block set repeatedly (e.g., P times) using only an antenna which belongs to subset a (e.g., a={$a_1, a_2, \ldots, a_v$}) among the N antennas 451a-1 to 451a-n to perform beam tracking. According to an embodiment, 1) when the electric field situation corresponds to a first specified range, the electronic device 101 may receive a synchronization signal block set using only an antenna which belongs to subset a (e.g., a={$a_1, a_2, \ldots, a_v$}) among the N antennas 451a-1 to 451a-n to perform beam tracking, 2) when the electric field situation corresponds to a second specified range, the electronic device 101 may receive a synchronization signal block set P times using only an antenna which belongs to subset a (e.g., a={$a_1, a_2, \ldots, a_v$}) among the N antennas 451a-1 to 451a-n to perform beam tracking, and 3) when the electric field situation corresponds to a third specified range, the electronic device 101 may receive a synchronization signal block set using all the N antennas 451a-1 to 451a-n to perform beam tracking. For example, the first specified range may refer to an electric field situation higher than the third specified range. Furthermore, the second specified range may refer to an electric field situation higher than the third specified range, or vice versa.

In the above-mentioned embodiments, it is assumed that the CP 411 configures one RF reception chain for one array antenna (e.g., the N antennas 451a-1 to 451a-n). However, the CP 411 may be connected with a plurality of RF reception chains for the one array antenna. According to an embodiment, the CP 411 may receive synchronization signal blocks using a plurality of antennas at the same time, using the plurality of RF reception chains. For example, when the CP 411 is connected with the plurality of RF reception chains for one array antenna (e.g., the N antennas 451a-1 to 451a-n), the electronic device 101 may receive each synchronization signal block set using the plurality of antennas at the same time. As an embodiment, when connected to two RF reception chains (e.g., first chains 451a-1, 451a-3, . . . , 451a-n-1 and second chains 451a-2, 451a-4, . . . , 451a-n) for the one array antenna (e.g., the N antennas 451a-1 to 451a-n), the electronic device 101 may receive a synchronization signal block set using the antenna 451a-1 and the antenna 451a-2 in the first period 601 and may receive a synchronization signal block set using the antenna 451a-3 and another antenna (not shown) at the same time in the second period 602. As another embodiment, when the CP 411 is connected with the plurality of RF reception chains for the one array antenna (e.g., the N antennas 451a-1 to 451a-n), the electronic device 101 may receive each synchronization signal block set using a plurality of antennas, which belong to each RF chain, at the same time. As an embodiment, when connected to two RF reception chains (e.g., the first chains 451a-1, 451a-3, . . . , 451a-n-1 and the second chains 451a-2, 451a-4, . . . , 451a-n) for the one array antenna (e.g., the N antennas 451a-1 to 451a-n), the electronic device 101 may receive a synchronization signal block set using the antenna 451a-1 and the antenna 451a-2 in the first period 601 and may receive a synchronization signal block set using the antenna 451a-2 and another antenna (not shown) at the same time in the second period 602.

When having a plurality of RF chains for one communication device (e.g., a first communication device 221, a second communication device 222, a third communication device 223, or a fourth communication device 224 of FIG. 2), the electronic device 101 may enable a plurality of antennas which belong to the one communication device at the same time to shorten a time taken to perform beam tracking.

Figure 8:
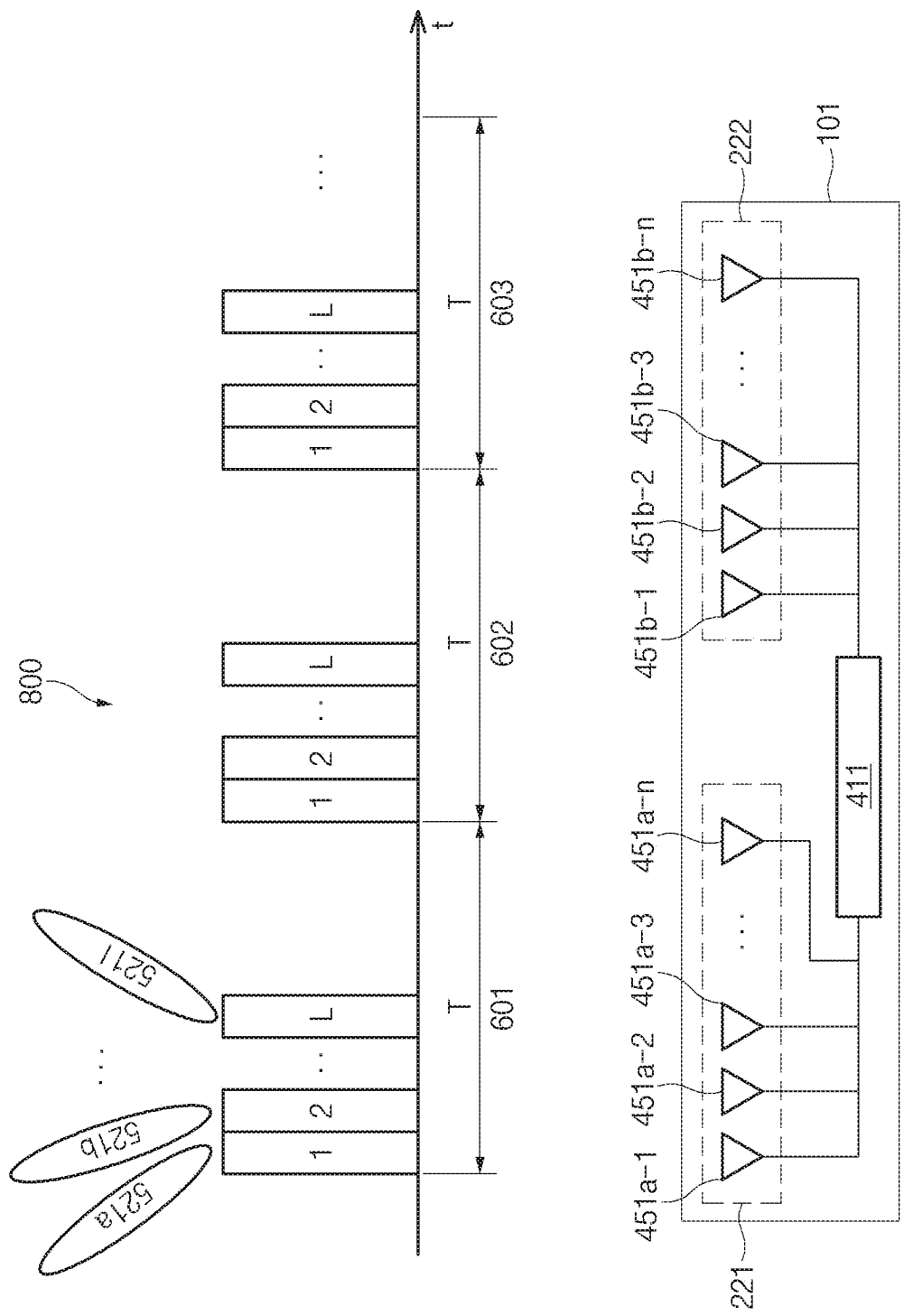
FIG. 8 is a conceptual diagram illustrating beam tracking of an electronic device according to various embodiments of the disclosure.

FIG. 8 is a conceptual diagram 800 illustrating beam tracking of an electronic device according to various embodiments of the disclosure.

In connection with FIGS. 5 to 7, embodiments are described about an example in which an electronic device 101 includes one communication device (e.g., a first antenna module 417a of FIG. 4). However, the above-mentioned embodiments are applicable when the electronic device 101 includes a plurality of communication devices. For example, for convenience of description, it may be assumed that the electronic device 101 includes two communication devices (e.g., a first antenna module 417a and a second antenna module 417b of FIG. 4). For example, a CP 411 of the electronic device 101 may be connected to N number of antennas 451a-1 to 451a-n (e.g., antenna elements) of a first communication device (e.g., the first antenna module 417a) and N number of antennas 451b-1, 451b-2, 451b-3 to 451b-n of a second communication device (e.g., the second antenna module 417b). For example, when the CP 411 is connected with one or more communication devices, the electronic device 101 may receive each synchronization signal block set using a plurality of antennas at the same time. As an embodiment, when having an array antenna (e.g., the N antennas 451a-1 to 451a-n) included in the first communication device and an array antenna (e.g., the N antennas 451b-1 to 451b-n) included in the second communication device, the electronic device 101 may receive a synchronization signal block set using the antenna 451a-1 and the antenna 451b-1 at the same time in a first period and may receive a synchronization signal block set using the antenna 451a-2 and the antenna 451b-2 at the same time in a second period 602. As another embodiment, when the CP 411 is connected with one or more communication devices, the electronic device 101 may sequentially receive respective synchronization signal block sets using a plurality of antennas. As an embodiment, when having the array antenna (e.g., the N antennas 451a-1 to 451a-n) included in the first communication device and the array antenna (e.g., the N antennas 451b-1 to 451b-n) included in the second communication device, the electronic device 101 may receive a synchronization signal block set using the antenna 451a-1 and the antenna 451a-2 in the first period 601 and may receive a synchronization signal block set using the antenna 451b-1 and the antenna 451b-2 in the second period 602.

For example, it may be assumed that a synchronization signal block set period is T, the number of antennas (e.g., the N antennas 451a-1 to 451a-n) of one array antenna associated with one communication device is N, and the number of RF reception chains associated with the one communication device is C. In this case, a beam tracking time $T_b$ for the one communication device of the electronic device 101 may be reduced based on Equation 6 below.

$$T_b = T \times \left\lceil \frac{N}{C} \right\rceil \qquad \text{Equation 6}$$

Figure 9:
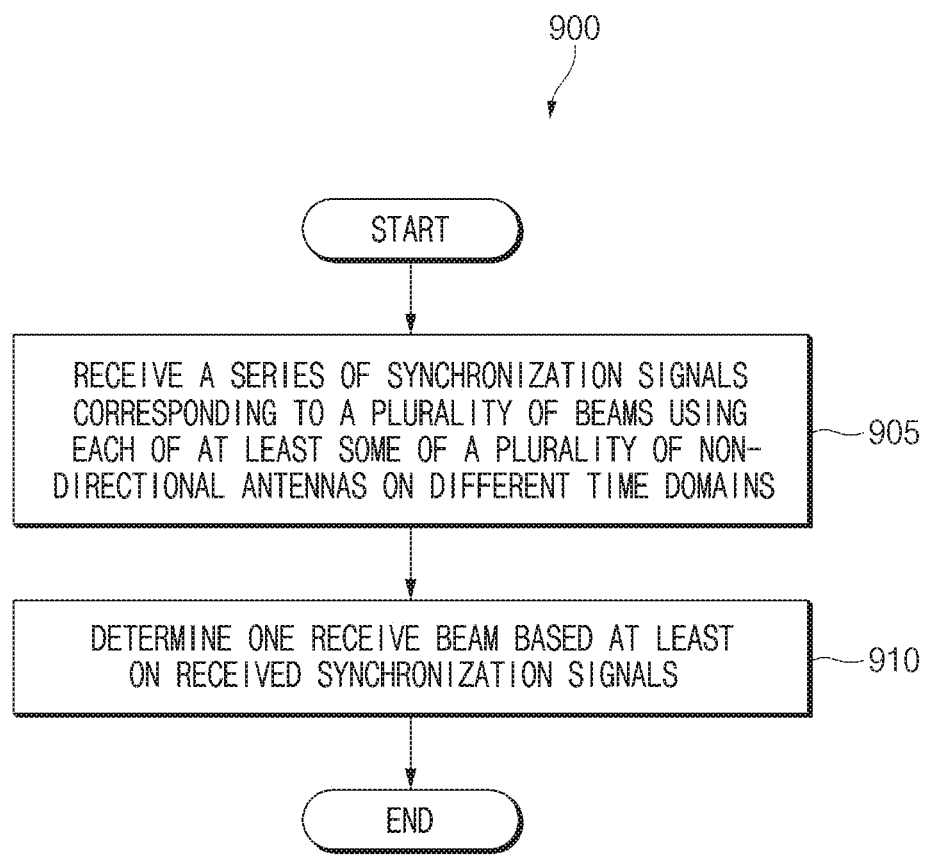
FIG. 9 is a flowchart illustrating a method of an electronic device according to various embodiments of the disclosure.

FIG. 9 is a flowchart illustrating a method 900 of an electronic device 101 according to various embodiments of the disclosure.

Referring to FIG. 9, the method 900 may be performed when the number of N antennas (e.g., antennas 451a-1 to 451a-n of FIG. 4) is less than the number M of beams generated by the N antennas.

According to various embodiments, in operation 905, the electronic device 101 may receive a series of synchronization signals (e.g., synchronization signal blocks included in a synchronization signal block set) corresponding to a plurality of beams using each of at least some of a plurality of non-directional antennas (e.g., the antennas 451a-1 to 451a-n of FIG. 4) on a different time domain. For example, the electronic device 101 may receive synchronization signals P (where P is an integer of greater than or equal to 1) times using all or some of antennas. The operation of transmitting the synchronization signals according to an embodiment is described above with reference to FIG. 7.

According to various embodiments, in operation 910, the electronic device 101 may determine one receive beam based at least on the received synchronization signals. For example, the electronic device 101 may determine a combination of at least receive beam and a beam of a base station (e.g., an external electronic device 504 of FIG. 5) using the received synchronization signals and a plurality of vectors (e.g., beamforming vectors) associated with beamforming. The detailed operation of determining the beam combination may refer to the details described above with reference to FIG. 7. According to an embodiment, the electronic device 101 may transmit information (e.g., beam index information) of the beam of the base station in the determined beam combination to the base station.

In the above-mentioned embodiments, the embodiments are described about one communication device of the electronic device 101 (e.g., a first communication device 221, a second communication device 222, a third communication device 223, or a fourth communication device 224 of FIG. 2). However, the above-mentioned embodiments are applicable to each communication device when the electronic device 101 includes a plurality of communication devices. For example, the electronic device 101 may include the plurality of communication devices, and a communication module (e.g., a communication module 250 of FIG. 2) may have one RF reception chain for each of the plurality of communication devices. In this case, the electronic device 101 may apply the above-mentioned embodiments at the same time or at substantially the same time with respect to the plurality of communication devices using each RF reception chain.

Figure 10:
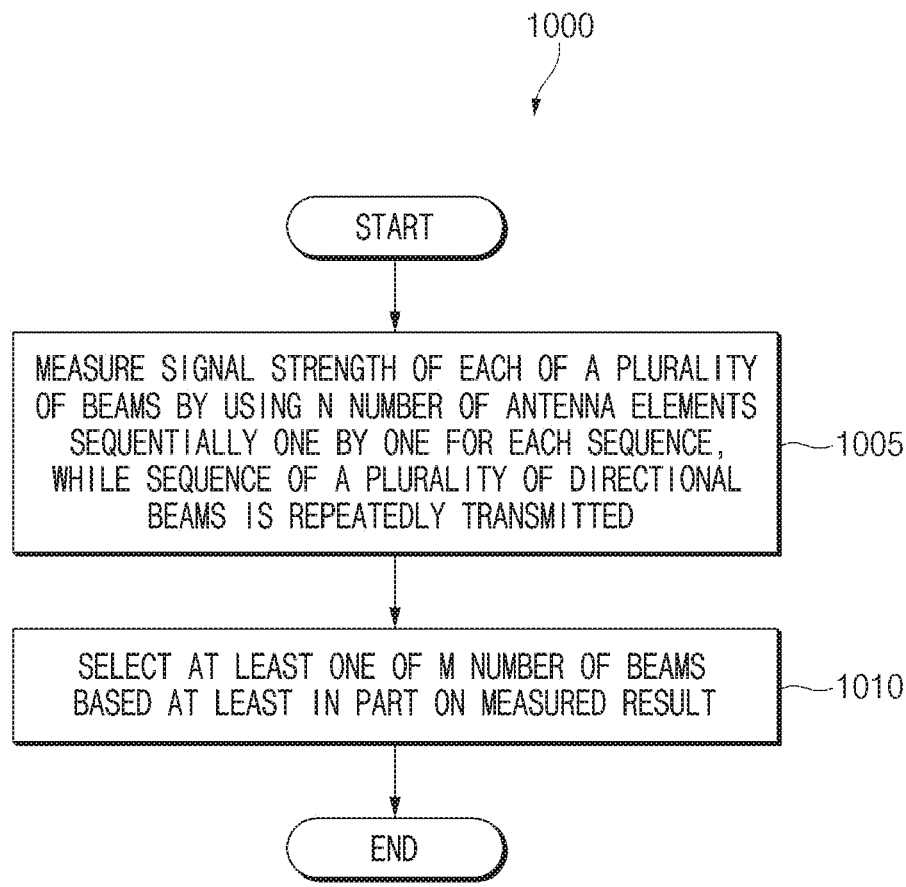
FIG. 10 is a flowchart illustrating a beam selection method of an electronic device according to various embodiments of the disclosure.

FIG. 10 is a flowchart 1000 illustrating a beam selection method of an electronic device according to various embodiments of the disclosure.

According to various embodiments, an electronic device (e.g., an electronic device 101 of FIG. 1) may include at least one memory (e.g., a memory 130 of FIG. 1), an antenna array (e.g., an antenna array 450a of FIG. 4) including N number of antenna elements arranged to form M number of beams, and at least one processor (e.g., a communication module 250 and/or a processor 240 of FIG. 2) operatively connected to the antenna array. For example, the at least one memory may include instructions, when executed, causing the at least one processor to perform operations of the electronic device 101, described below.

According to various embodiments, in operation 1005, the electronic device 101 may measure signal strength of each of a plurality of beams, using N number of antenna elements sequentially one by one for each sequence, while a sequence (e.g., a synchronization signal block set) of a plurality of directional beams is repeated transmitted from at least one base station (e.g., an external electronic device 504 of FIG. 5). For example, the sequence of the plurality of directional beams may include a plurality of directional beams (e.g., L number of beams 521a, 521b to 521l of FIG. 5), each of which has a different direction. For example, the plurality of directional beams may include a plurality of synchronization signal blocks (e.g., synchronization signal blocks 1 to L of FIG. 6) corresponding to a plurality of beams.

According to various embodiments, in operation 1010, the electronic device 101 may select at least one of M number of beams based at least in part on the measured result. For example, each of N and M may be an integer of greater than or equal to 2. According to an embodiment, M may be greater than N. According to an embodiment, the electronic device 101 may apply a phase vector corresponding to the at least one beam selected among the M beams to the antenna array and may receive a signal from the at least one base station.

According to various embodiments, the electronic device 101 may select one of L number of beams from at least one base station based at least in part on the measured result. For example, the electronic device 101 may select one of L number of beams using the plurality of received synchronization signal blocks. According to an embodiment, the electronic device 101 may transmit information corresponding to the at least one beam selected among the L beams to the at least one base station. According to various embodiments, a user equipment may include a memory (e.g., a memory 130 of FIG. 1), a communication device (e.g., a communication device 300 of FIG. 3) including a plurality of N number of conductive plates (e.g., a first AE group 340 and/or a second AE group 345 of FIG. 3) arranged to form M number of beams, and at least one processor (e.g., a processor 240 and/or a communication module 250 of FIG. 2) operatively connected to the memory and the communication device. The at least one processor may be configured to receive a synchronization signal block set including a plurality of synchronization signal blocks corresponding to a plurality of beams from a base station (e.g., an external electronic device 504 of FIG. 5) using each of at least some of the plurality of N conductive plates and select at least one of the M beams using the plurality of received synchronization signal blocks. For example, each of N and M may be an integer of greater than or equal to 2.

According to an embodiment, the at least one processor may be configured to perform analog beamforming using the plurality of N conductive plates. M may be greater than N.

According to an embodiment, the at least one processor may be configured to apply the at least one selected beam to the communication device and receive a signal from the base station.

According to an embodiment, the synchronization signal block set may include a plurality of synchronization signal blocks corresponding to L number of beams. L may be an integer of greater than or equal to 2. The at least one processor may be configured to select one of the L beams using the plurality of received synchronization signal blocks.

According to an embodiment, the at least one processor may be further configured to transmit information corresponding to one beam selected among the L beams to the base station using the communication device.

According to an embodiment, the at least one processor may be configured to receive a reference signal from the base station, obtain a channel state based on the received reference signal, receive the synchronization signal block set from the base station using each of some of the plurality of N conductive plates when the channel state is greater than or equal to a specified range, and receive the synchronization signal block set from the base station using each of the plurality of N conductive plates when the channel state is less than the specified range.

According to an embodiment, the at least one processor may be configured to receive a reference signal from the base station, obtain a channel state based on the received reference signal, and repeatedly receive the synchronization signal block set from the base station using each of the plurality of N conductive plates when the channel state is less than a specified range.

According to an embodiment, the at least one processor may be configured to receive information including information about a period of the synchronization signal block set from the base station.

According to various embodiments, a method of a user equipment (e.g., an electronic device 101 of FIG. 1) including a communication device (e.g., a communication device 300 of FIG. 3) including a plurality of N number of conductive plates (e.g., a first AE group 340 and/or a second AE group 345 of FIG. 3) arranged to form M number of beams may include receiving a synchronization signal block set including a plurality of synchronization signal blocks corresponding to a plurality of directional beams from a base station (e.g., an external electronic device 504 of FIG. 5) using each of at least some of the plurality of N conductive plates and selecting at least one of the M beams using the plurality of received synchronization signal blocks. For example, each of N and M may be an integer of greater than or equal to 2.

According to an embodiment, the user equipment may be configured to perform analog beamforming using the plurality of N conductive plates. M may be greater than N.

According to various embodiments, the method may further include applying the at least one selected beam to the communication device and receiving a signal from the base station.

According to various embodiments, the synchronization signal block set may include a plurality of synchronization signal blocks corresponding to L number of beams. L may be an integer of greater than or equal to 2. The method may further include selecting one of the L beams using the plurality of received synchronization signal blocks.

According to various embodiments, the method may further include transmitting information corresponding to one beam selected among the L beams to the base station using the communication device.

According to various embodiments, the method may further include receiving a reference signal from the base station, obtaining a channel state based on the received reference signal, receiving the synchronization signal block set from the base station using each of some of the plurality of N conductive plates when the channel state is greater than or equal to a specified range, and receiving the synchronization signal block set from the base station using each of the plurality of N conductive plates when the channel state is less than the specified range.

According to an embodiment, the method may further include receiving a reference signal from the base station, obtaining a channel state based on the received reference signal, and repeatedly receive the synchronization signal block set from the base station using each of the plurality of N conductive plates when the channel state is less than a specified range.

According to various embodiments, a user equipment may include a memory (e.g., a memory 130 of FIG. 1), a communication device (e.g., a communication device 300 of FIG. 3) including a plurality of N number of conductive plates (e.g., a first AE group 340 and/or a second AE group 345 of FIG. 3) arranged to form M number of beams, and at least one processor (e.g., a processor 240 and/or a communication module 250 of FIG. 2) operatively connected to the memory and the communication device. The at least one processor may be configured to receive a synchronization signal block set including L number of synchronization signal blocks corresponding to L number of transmit beams from a base station using each of at least some of the plurality of N conductive plates and select one of the L transmit beams using the plurality of received synchronization signal blocks. Each of M, N, and L may be an integer of greater than or equal to 2.

According to an embodiment, the at least one processor may be configured to transmit information associated with the selected transmit beam to the base station.

According to an embodiment, the at least one processor may be further configured to select one of the M beams using the plurality of received synchronization signal blocks.

According to an embodiment, the at least one processor may be configured to select one transmit beam among the L beams and one of the M beams, at least using the plurality of received synchronization signal blocks and M number of weights associated with the M beams.

According to an embodiment, each of the M weights may be a different beamforming vector.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in the disclosure, the user equipment may reduce a time for beam tracking and power consumption.

According to various embodiments disclosed in the disclosure, the user equipment may increase data throughout by reducing a time for beam tracking.

In addition, various effects directly or indirectly ascertained through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a memory;
   a communication device comprising a plurality of N number of conductive plates arranged to form M number of beams; and
   at least one processor operatively connected to the memory and the communication device,
   wherein the at least one processor is configured to:
      receive a synchronization signal block set comprising a plurality of synchronization signal blocks corresponding to a plurality of beams from a base station using each of at least some of the plurality of N conductive plates,
      select at least one of the M beams using the plurality of received synchronization signal blocks,
      receive a reference signal from the base station,
      obtain a channel state based on the received reference signal,
      receive a synchronization signal block set from the base station using each of a part of the plurality of N conductive plates, when the channel state is greater than or equal to a specified range, and
      receive the synchronization signal block set from the base station using each of the plurality of N conductive plates, when the channel state is less than the specified range,
   wherein each of N and M is an integer of greater than or equal to 2.

2. The electronic device of claim 1, wherein the at least one processor is further configured to perform analog beamforming using the plurality of N conductive plates.

3. The electronic device of claim 2, wherein M is greater than N.

4. The electronic device of claim 2, wherein the at least one processor is further configured to:
   receive a signal from the base station by applying the at least one selected beam to the communication device.

5. The electronic device of claim 1,
   wherein the synchronization signal block set includes a plurality of synchronization signal blocks corresponding to L number of beams,
   wherein L is an integer of greater than or equal to 2, and
   wherein the at least one processor is further configured to select one of the L beams using the plurality of received synchronization signal blocks.

6. The electronic device of claim 5, wherein the at least one processor is further configured to transmit information corresponding to one beam selected among the L beams to the base station.

7. The electronic device of claim 1, wherein the at least one processor is further configured to:
   receive a reference signal from the base station;
   obtain a channel state based on the received reference signal; and
   repeatedly receive synchronization signal block sets from the base station using each of the plurality of N conductive plates, when the channel state is less than a specified range.

8. The electronic device of claim 1, wherein the at least one processor is further configured to receive information comprising information about a period of the synchronization signal block set from the base station.

9. An electronic device, comprising:
   at least one memory;
   an antenna array including N number of antenna elements arranged to form M number of beams; and
   at least one processor operatively connected to the antenna array,
   wherein a memory stores instructions, when executed by the at least one processor, causes the at least one processor to:
      while a sequence of a plurality of directional beams, each of which has a different direction, is repeatedly transmitted from at least one base station, measure signal strength of each of the plurality of directional beams, by using the N antenna elements sequentially one by one for each sequence,
      select at least one of the M beams based at least in part on the measured result,
      receive a reference signal from the base station,
      obtain a channel state based on the received reference signal,
      receive a synchronization signal block set from the base station using each of a part of a plurality of N conductive plates, when the channel state is greater than or equal to a specified range, and
      receive the synchronization signal block set from the base station using each of the plurality of N conductive plates, when the channel state is less than the specified range.

10. The electronic device of claim 9, wherein M is greater than N.

11. The electronic device of claim 9, wherein the plurality of directional beams comprise a plurality of synchronization signal blocks corresponding to the plurality of directional beams.

12. The electronic device of claim 11,
wherein the synchronization signal blocks comprise L number of synchronization signal blocks corresponding to L number of directional beams,
wherein L is an integer of greater than or equal to 2, and
wherein the instructions, when executed, cause the at least one processor to:
select one of the L directional beams using a plurality of received synchronization signal blocks.

13. The electronic device of claim 12, wherein the instructions, when executed, cause the at least one processor to:
transmit information corresponding to the at least one directional beam selected among the L directional beams to the at least one base station.

14. The electronic device of claim 9, wherein the instructions, when executed, cause the at least one processor to:
apply a phase vector corresponding to the at least one beam selected among the M beams to the antenna array; and
receive a signal from the at least one base station.

15. An electronic device, comprising:
a memory;
a communication device comprising a plurality of N number of conductive plates arranged to form M number of beams; and
at least one processor operatively connected to the memory and the communication device,
wherein the at least one processor is configured to:
receive a synchronization signal block set comprising L number of synchronization signal blocks corresponding to L number of transmit beams from a base station using each of at least some of the plurality of N conductive plates,
select one of the L transmit beams using the plurality of received synchronization signal blocks,
receive a reference signal from the base station,
obtain a channel state based on the received reference signal,
receive a synchronization signal block set from the base station using each of a part of the plurality of N conductive plates, when the channel state is greater than or equal to a specified range, and
receive the synchronization signal block set from the base station using each of the plurality of N conductive plates, when the channel state is less than the specified range, and
wherein each of M, N, and L is an integer of greater than or equal to 2.

16. The electronic device of claim 15, wherein the at least one processor is further configured to transmit information associated with the selected transmit beam to the base station.

17. The electronic device of claim 15, wherein the at least one processor is further configured to select one of the M beams using the plurality of received synchronization signal blocks.

18. The electronic device of claim 17, wherein the at least one processor is further configured to select one transmit beam among the L beams and one of the M beams, at least using the plurality of received synchronization signal blocks and M number of weights associated with the M beams.

19. The electronic device of claim 18, wherein each of the M weights is a different beamforming vector.

* * * * *